(12) United States Patent
Nakaho et al.

(10) Patent No.: US 7,692,843 B2
(45) Date of Patent: Apr. 6, 2010

(54) ELECTROCHROMIC MIRROR

(75) Inventors: Junichi Nakaho, Aichi-ken (JP);
Masaharu Hattori, Aichi-ken (JP);
Atsushi Yamaguchi, Aichi-ken (JP);
Nagahiro Saito, Aichi-ken (JP);
Takahiro Ishizaki, Aichi-ken (JP);
Osamu Takai, Aichi-ken (JP)

(73) Assignees: Kabushiki Kaisha Tokai-Rika-Denki-Seisakusho, Aichi-ken (JP); National University Corporation Nagoya University, Aichi-ken (JP)

( * ) Notice: Subject to any disclaimer, the term of this patent is extended or adjusted under 35 U.S.C. 154(b) by 87 days.

(21) Appl. No.: 12/144,128

(22) Filed: Jun. 23, 2008

(65) Prior Publication Data
US 2009/0002799 A1 Jan. 1, 2009

(30) Foreign Application Priority Data
Jun. 26, 2007 (JP) .............................. 2007-167911
Feb. 8, 2008 (JP) .............................. 2008-029330

(51) Int. Cl.
*G02F 1/153* (2006.01)
(52) U.S. Cl. ...................................... 359/267; 359/270
(58) Field of Classification Search .......... 359/265–275
See application file for complete search history.

(56) References Cited

U.S. PATENT DOCUMENTS 3,844,636 A 10/1974 Maricle et al.
5,446,577 A * 8/1995 Bennett et al. .............. 359/273

FOREIGN PATENT DOCUMENTS

WO 94/16356 A1 7/1994

OTHER PUBLICATIONS

European Search Report dated Sep. 23, 2009 from corresponding European Patent Application No. EP 08 01 1425.

* cited by examiner

*Primary Examiner*—Ricky L Mack
*Assistant Examiner*—Tuyen Q Tra
(74) *Attorney, Agent, or Firm*—Roberts Mlotkowski Safran & Cole, P.C.; Thomas W. Cole

(57) ABSTRACT

An electrochromic mirror includes an electrically conductive reflective film capable of reflecting light that is incident thereto and having electrical conductivity in which plural fine penetration holes are formed, an electrochromic film that is provided at a side of the electrically conductive reflective film at which the light is incident and reflected, an electrically conductive film that is provided at a side of the electrically conductive reflective film that is opposite from the electrochromic film, and an electrolytic solution that contains lithium ions and is enclosed between the electrically conductive film and the electrically conductive reflective film. The plural penetration holes formed in the electrically conductive reflective film penetrate in a thickness direction thereof, and a ratio between a distance between respective centers of the penetration holes and an inner peripheral diameter dimension of the penetration holes is 7 or more.

12 Claims, 15 Drawing Sheets

ELECTROCHROMIC MIRROR

CROSS-REFERENCE TO RELATED APPLICATION

This application claims priority under 35 USC 199 from Japanese Patent Application Nos. 2007-167911 and 2008-029330, the disclosures of which are incorporated by reference herein.

BACKGROUND OF THE INVENTION

1. Field of the Invention

The present invention relates to an electrochromic mirror that is used, for example, in a rearview outer mirror or rearview inner mirror of a vehicle, and in which reflectance is changed by applying a voltage.

2. Description of the Related Art

In the specification of U.S. Pat. No. 3,844,636, an electrochromic mirror is disclosed, in which an electrochromic film is colored due to the electrochromic film undergoing a reduction reaction, whereby transmission of reflected light is reduced, resulting in reflectance of light being reduced.

In the configuration disclosed in the specification of U.S. Pat. No. 3,844,636, plural holes are formed in an electrically conductive reflective film, but due to simply forming the holes, there is a possibility that reflectance will be lowered, diffractive scattering of light will occur, or the like, whereby a clear reflected image cannot be obtained.

Thus, an electrochromic mirror is demanded which can prevent or effectively suppress the occurrence of problems, such as reflectance being greatly reduced or the like, and can obtain a clear reflected image, even when a configuration is provided in which holes are formed in an electrically conductive reflective film.

SUMMARY OF THE INVENTION

The present invention has been made in view of the above circumstances and provides an electrochromic mirror.

According to a first aspect of the invention, there is provided an electrochromic mirror comprising: an electrically conductive reflective film capable of reflecting light that is incident thereto and having electrical conductivity, the electrically conductive reflective film having formed therein a plurality of fine penetration holes that penetrate in a thickness direction of the electrically conductive reflective film, and a ratio of a distance between respective centers of the penetration holes and an inner peripheral diameter dimension of the penetration holes being 7 or more; an electrochromic film that is provided at a side of the electrically conductive reflective film at which the light is incident and reflected, and that is colored due to being subjected to a reduction reaction; an electrically conductive film having electrical conductivity that is provided at a side of the electrically conductive reflective film that is opposite from the electrochromic film; and an electrolytic solution that comprises lithium ions and is enclosed between the electrically conductive film and the electrically conductive reflective film, and in which, due to applying a voltage such that the electrically conductive film is made positive and the electrically conductive reflective film is made negative, the lithium ions are provided to the reduction reaction of the electrochromic film.

BRIEF DESCRIPTION OF THE DRAWINGS

Preferred embodiments of the present invention will be described in detail based on the following figures, wherein.

DETAILED DESCRIPTION OF THE INVENTION

Configuration of First Exemplary Embodiment

Figure 1:
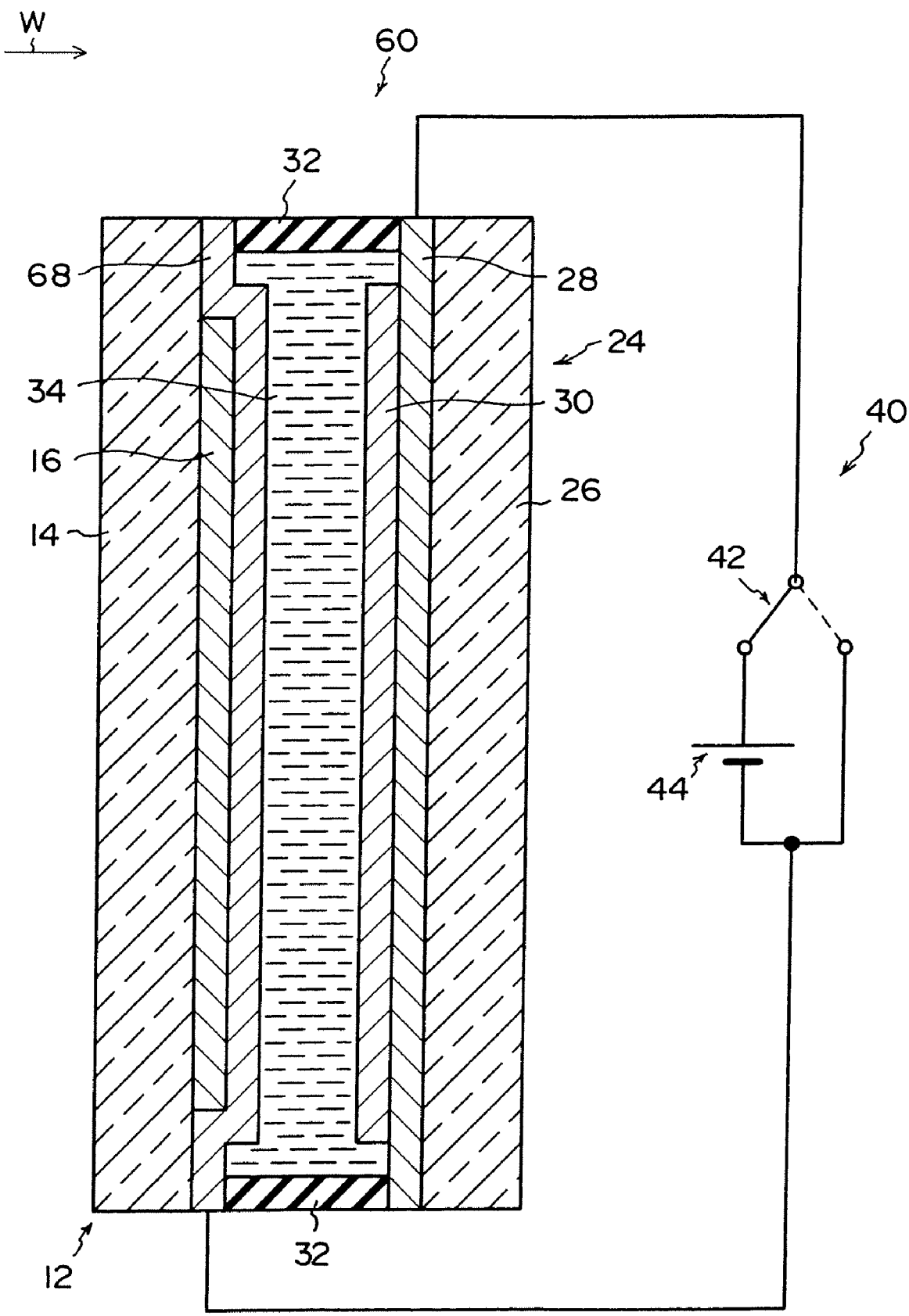
FIG. 1 is a cross-sectional view showing the outline of the configuration of an electrochromic mirror according to a first exemplary embodiment of the present invention.

In FIG. 1, the configuration of an electrochromic mirror 60 according to a first exemplary embodiment of the present invention is shown in a schematic cross-sectional view.

As shown in this drawing, the electrochromic mirror 60 is provided with a front surface side substrate 12. The front surface side substrate 12 is provided with a transparent substrate main body 14 formed from glass or the like. At a surface at one thickness direction (arrow W direction in FIG. 1) side of the substrate main body 14, an electrochromic film 16 is formed. The electrochromic film 16 is formed, for example, from tungsten trioxide ($WO_3$), molybdenum trioxide ($MoO_3$), or a mixture containing such an oxide, and in particular, in the present exemplary embodiment, the electrochromic film 16 is formed from tungsten trioxide.

A thickness of the electrochromic film 16 along the thickness direction of the substrate main body 14 is set in a range of from 300 nm to 1000 nm, and in particular, in the present exemplary embodiment, the thickness of the electrochromic film 16 is set at 500 nm. At a surface at a side of the electrochromic film 16 that is opposite from the substrate main body 14, an electrically conductive reflective film 68 is formed. The electrically conductive reflective film 68 has electrical conductivity and is formed from a metal having luster and through which transmission of lithium ions is possible, such as, for example, rhodium (Rh), ruthenium (Ru), palladium (Pd), nickel (Ni) or the like. A thickness of the electrically conductive reflective film 68 along the thickness direction of the substrate main body 14 is set in a range of from 30 nm to 200 nm, and in particular, in the present exemplary embodiment, the thickness of the electrically conductive reflective film 68 is set at 50 nm.

Figure 2:
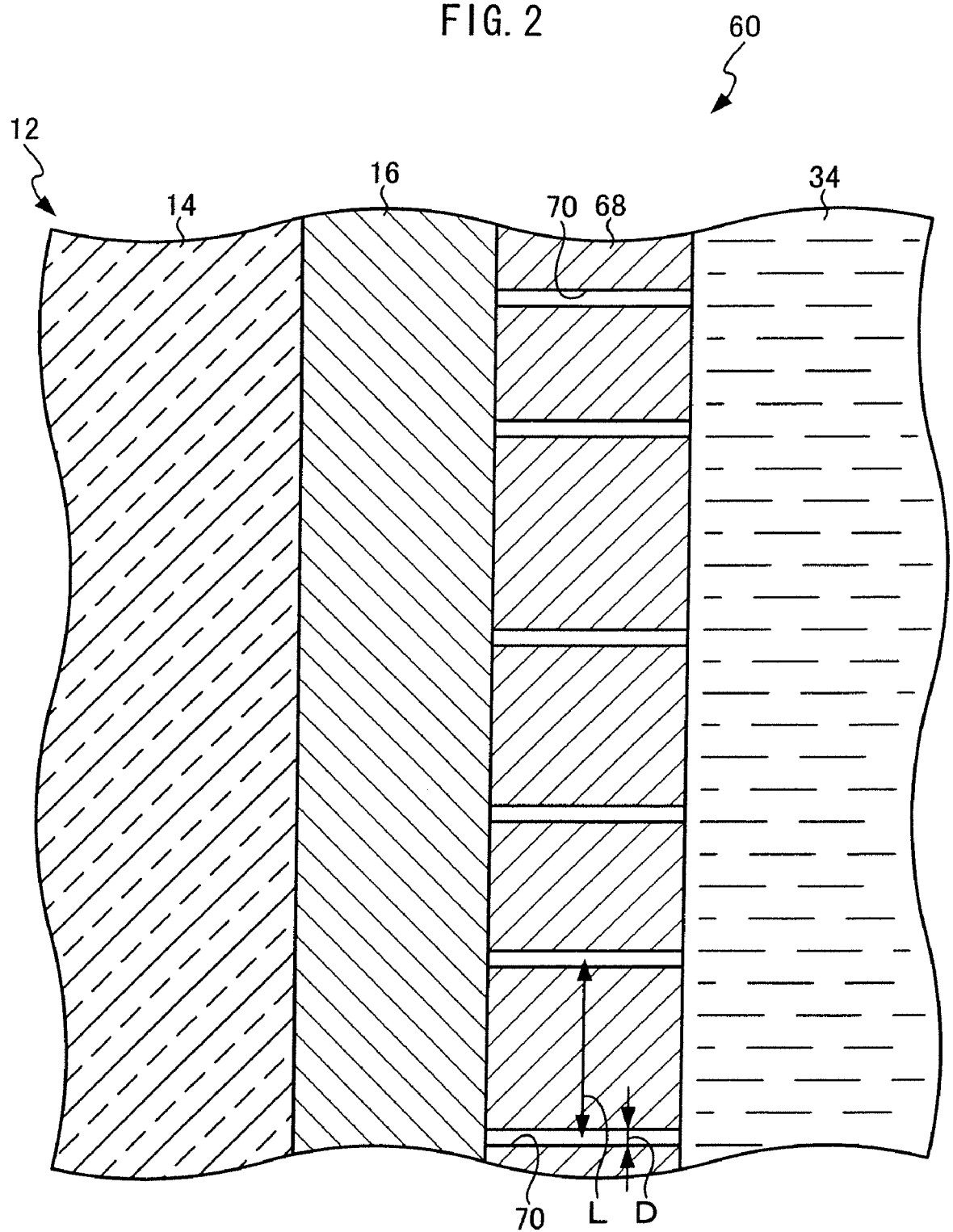
FIG. 2 is a schematic cross-sectional view in which the main portion of the electrochromic mirror according to the first exemplary embodiment of the present invention is enlarged.

Further, as shown in FIG. 2, plural fine penetration holes 70 that penetrate in the thickness direction of the electrically conductive reflective film 68 are formed therein. An inner diameter (diameter of an inner peripheral portion) dimension D of the penetration holes 70 is 20 μm or less, and in particular, in the present exemplary embodiment, it is made to be 0.5 μm. Further, the penetration holes 70 are basically formed irregularly (randomly) in the electrically conductive reflective film 68. However, the penetration holes 70 are configured such that a distance L between centers of adjacent penetration holes 70 is 20 μm or less, and more preferably 10 μm or less, and in particular, in the present exemplary embodiment, the distance L between centers is set at 5 μm or less.

Furthermore, the penetration holes 70 are configured such that a ratio of the inner diameter (diameter of an inner peripheral portion) dimension D of the penetration holes 70 and the distance L between centers of adjacent penetration holes 70 is 7 or more, and such that a ratio of the distance L between centers and the inner diameter dimension D, which is a reciprocal thereof, is 0.5 or less.

The penetration holes 70 are formed by providing a photomask, in which a pattern of the penetration holes 70 is printed on the electrically conductive reflective film 68 on which a photoresist has been coated, and carrying out exposure, followed by removing the photoresist corresponding to the penetration holes 70 and dissolving the electrically conductive reflective film 68 with an etching solution.

At one thickness direction side of the front surface side substrate 12 of the above configuration, a back surface side substrate 24 is provided so as to face the front surface side substrate 12. The back surface side substrate 24 is provided with a transparent substrate main body 26 formed from glass or the like. At a surface at the other thickness direction side, i.e., the front surface side substrate 12 side, of the substrate main body 26, an electrically conductive film 28 is formed. The electrically conductive film 28 is formed from a metal such as chrome (Cr) or nickel (Ni), indium tin oxide ($IN_2O_3$:Sn, or so-called "ITO"), tin oxide ($SnO_2$), fluorine-doped tin oxide ($SnO_2$:F), zinc oxide ($ZnO_2$) or the like, or from a mixture of these.

At a surface at the front surface side substrate 12 side of the electrically conductive film 28, a carbon film 30 having electrical conductivity is formed. The carbon film 30 comprises a synthetic resin material such as a phenol resin, a polyimide resin, an acrylic resin or the like, as a binder. Further, in addition to these binders, the carbon film 30 is formed from a mixture of graphite, carbon black and activated carbon, and in particular, the activated carbon is contained in this mixture in an amount of 50 weight % or more.

A thickness dimension of the carbon film 30 along the thickness direction of the substrate main body 26 is set to be 50 μm or more, and in the carbon film 30 of the above configuration, a capacitance is set to be 10 mF/cm$^2$ or greater, or a charge storage capacity at a voltage of 1.5 V is set to be 15 mQ/cm$^2$ or greater. In particular, in the present exemplary embodiment, the capacitance is set to be 20 mF/cm$^2$, or the charge storage capacity at a voltage of 1.5 V is set to be 30 mQ/cm$^2$.

Between the front surface side substrate 12 and the back surface side substrate 24 of the above configuration, a predetermined clearance is formed, and sealing by a sealant 32 is carried out between an outer peripheral portion of the front surface side substrate 12 and an outer peripheral portion of the back surface side substrate 24. Within the space surrounded by the front surface side substrate 12, the back surface side substrate 24 and the sealant 32, an electrolytic solution 34 is enclosed. The electrolytic solution 34 comprises a solvent formed from propylene carbonate, ethylene carbonate, butylene carbonate, diethyl carbonate, γ-butyrolactone, dimethyl formamide or the like, or from a mixture of these, and in particular, in the present exemplary embodiment, propylene carbonate is used as the solvent.

In addition to such a solvent, the electrolytic solution 34 comprises lithium perchlorate ($LiClO_4$), lithium hexafluorophosphate ($LiPF_6$), lithium tetrafluoroborate ($LiBF_4$), lithium bis(trifluoromethane-sulfonyl)imide ($LiN(SO_2CF_3)_2$), lithium bis(pentafluoroethane-sulfonyl)imide ($LiN(SO_2C_2F_5)_2$), lithium trifluoromethanesulfonate ($LiCF_3SO_3$) or the like, or a mixture of these, as an electrolyte, and in particular, in the present exemplary embodiment, lithium perchlorate is used as the electrolyte.

Furthermore, the electrically conductive film 28 of the electrochromic mirror 60 of the above configuration is connected to a switch 42 constituting a circuit 40. In the switch 42, a positive electrode of a direct-current power source 44, which is constituted by a battery or the like mounted at a vehicle and has a rated voltage of about 1.3 V, is connected to a terminal that is connected in an ON state. A negative electrode of the direct-current power source 44 is connected to the electrically conductive reflective film 68. Further, a terminal at which the switch 42 is connected in an OFF state is connected to the electrically conductive reflective film 68 without being connected through the aforementioned direct-current power source 44, and in the OFF state, the electrically conductive film 28 and the electrically conductive reflective film 68 are short-circuited.

Operation and Effects of First Exemplary Embodiment

In the electrochromic mirror 60 of the above configuration, in the OFF state of the switch 42, the electrochromic film 16 becomes substantially transparent, and for this reason, light that is incident from the side of the substrate main body 14 that is opposite from the electrochromic film 16 is transmitted through the substrate main body 14 and the electrochromic film 16 and is reflected at the electrically conductive reflective film 68. Furthermore, light that is reflected at the electrically conductive reflective film 68 is transmitted through the electrochromic film 16 and the substrate main body 14, and in the present exemplary embodiment of the above configuration, reflectance of light becomes about 55% as a result.

On the other hand, when the switch 42 is switched to the ON state, electrons (e$^-$) that have moved through the circuit 40 to the side of the electrically conductive reflective film 68 pass through the penetration holes 70 and enter into the electrochromic film 16, and lithium ions (Li⁺) constituting the electrolyte of the electrolytic solution 34 are transmitted through the electrically conductive reflective film 68 and enter into the electrochromic film 16. As a result, in the electrochromic film 16, the reduction reaction of the following formula 1 occurs, and $Li_xWO_3$ of a blue color referred to as so-called tungsten bronze is formed in the electrochromic film 16.

$$Li^+ + e^- + WO_3 \rightarrow Li_xWO_3 \quad \text{(Formula 1)}$$

Due to the electrochromic film 16 being colored with a blue color in this manner, the reflectance, which was about 55% before the electrochromic film 16 was colored, is reduced to about 7%.

Furthermore, when the aforementioned reduction reaction occurs, electrons (e⁻) are moved from the carbon constituting the carbon film 30 to the side of the direct-current power source 44, whereby negative ions ($ClO_4^-$) of the lithium perchlorate constituting the electrolyte are moved to the side of carbon film 30. As a result, a compensation reaction such as shown in the following formula 2, with respect to the aforementioned reduction reaction, occurs.

$$ClO_4^- + C - e^- \rightarrow C^+ \cdot ClO_4^- \quad \text{(Formula 2)}$$

Figure 3:
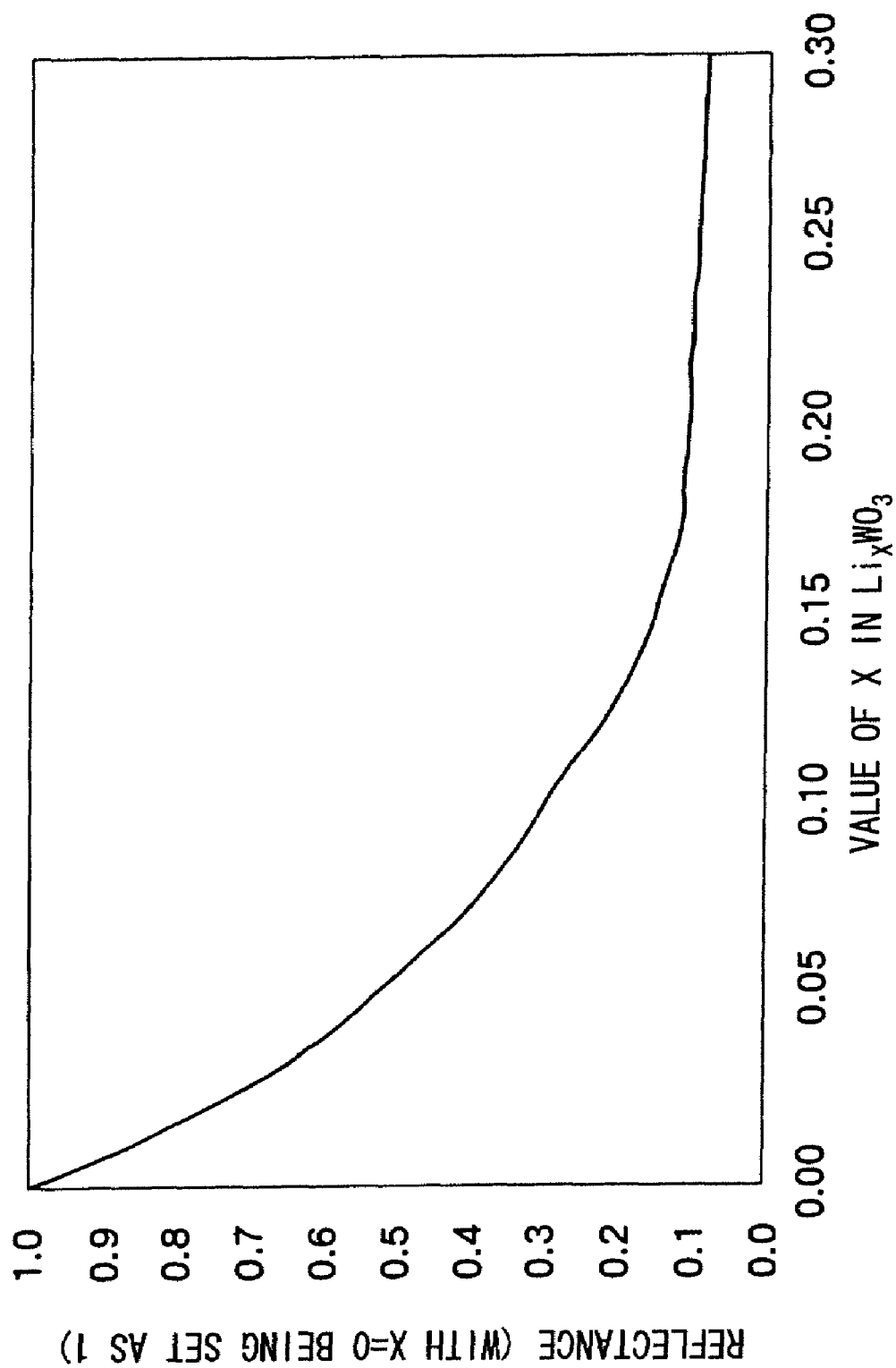
FIG. 3 is a graph showing the relationship between X in $Li_xWO_3$ and reflectance of light.

In FIG. 3, the relationship between X in $Li_xWO_3$ and the reflectance of light is shown in a graph. It should be noted that in this graph, a case where X=0, i.e., a case where the tungsten trioxide is transparent, is standardized as 1. As shown in this graph, at X=0.15 or greater, saturation of the reflectance generally occurs, and accordingly, at about X=0.15 to 0.2, sufficient coloring is achieved in the electrochromic film 16.

Figure 4:
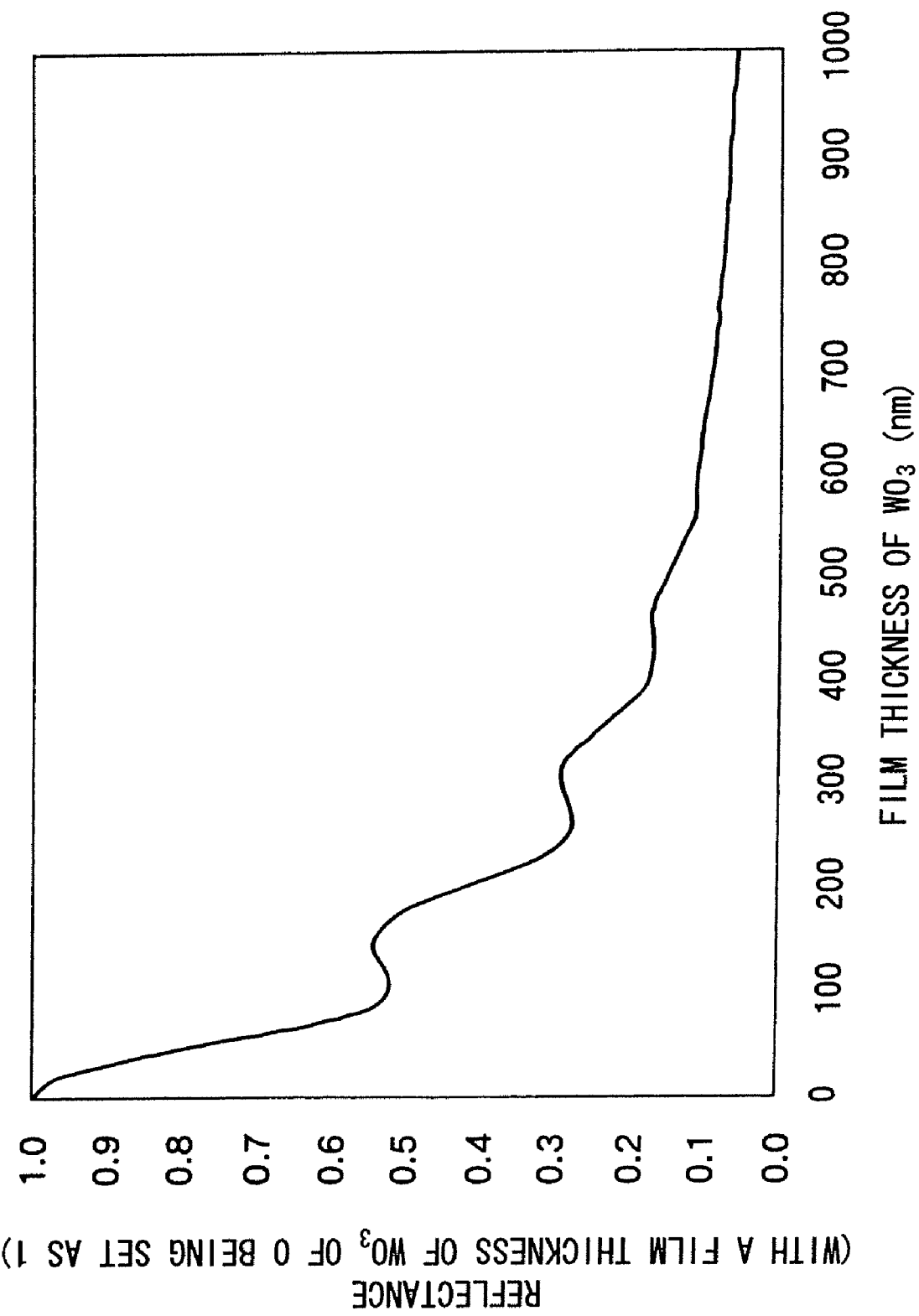
FIG. 4 is a graph showing the relationship between the thickness of an electrochromic film and reflectance.

On the other hand, in FIG. 4, the relationship between the film thickness of the electrochromic film 16 and the reflectance is shown in a graph. It should be noted that in this graph, the reflectance when there is no electrochromic film 16 is standardized as 1. As shown in this graph, since the reflectance sharply decreases up until the film thickness of the electrochromic film 16 becomes 300 nm and saturation occurs at 500 nm, the film thickness of the electrochromic film 16 is preferably set in the range of from 300 nm to 500 nm.

If the value of X in $Li_xWO_3$ is set at 0.15, a film thickness d of the electrochromic film 16 is set at 500 nm, a bulk density ρ of the tungsten trioxide constituting the electrochromic film 16 is set at 7.18 g/cm³, a degree of hole P of the tungsten trioxide constituting the electrochromic film 16 is set at 0.8, a Faraday constant F is set at 96485.3415 Q/mol, a molecular weight M of the tungsten trioxide is set at 231.9 mol, and these are substituted in the following formula 3, a charge storage capacity Q becomes 17.92 mQ/cm², and furthermore, if an applied voltage V is set at 1.3 and the result of formula 3 (i.e., Q=17.92 mQ/cm²) is substituted in the following formula 4, a capacitance C becomes 13.79 mF/cm².

$$Q = (X \cdot d \cdot \rho \cdot P \cdot F)/M \quad \text{(Formula 3)}$$

$$C = Q/V \quad \text{(Formula 4)}$$

In other words, for the reduction reaction in order for coloring to be sufficiently carried out in the electrochromic film 16, the charge storage capacity obtained by the above formula 3 and the capacitance obtained by the above formula 4 become necessary. In the present exemplary embodiment, the carbon film 30 comprises activated carbon. The activated carbon is porous, and thus, the surface area is large. For this reason, it has a capacity for storing many negative ions and positive charges, and as a result, the capacitance of the carbon film 30 can be set at 20 mF/cm², or the charge storage capacity at a voltage of 1.5 V can be set to 30 mQ/cm².

In this manner, in the present exemplary embodiment, the capacitance and the charge storage capacity are both sufficiently larger than the calculation results in the above formula 3 and formula 4. Therefore, a sufficient reduction reaction can be caused to occur in the electrochromic film 16, and as a result, by switching the switch 42 to the ON state and applying a voltage, the electrochromic film 16 can be sufficiently colored, as discussed above.

Further, the carbon film 30 contains not only the activated carbon, but also graphite and carbon ink, and as a result, the carbon film 30 is provided with sufficient electrical conductivity, and the reaction in the carbon film 30 can be made to be faster.

Furthermore, in the present exemplary embodiment, at the time of coloring the electrochromic film 16, the voltage that is applied can be lowered to 1.3 V. As a result, when the switch 42 is switched to the OFF state and the electrically conductive reflective film 68 and the electrically conductive film 28 are short-circuited, a reaction in the opposite direction from the above formula 1 and formula 2 occurs, and the electrochromic film 16 is quickly decolored.

When the electrochromic mirror 60 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear turns on its headlights, by switching the switch 42 to the ON state to color the electrochromic film 16 and reduce the reflectance, reflected light of the headlights can be reduced, and glare is lowered.

Further, in the electrochromic mirror 60 of the above configuration, due to the fact that lithium ions (Li⁺) constituting the electrolyte of the electrolytic solution 34 pass through the penetration holes 70, the lithium ions (Li⁺) enter into the electrochromic film 16 more quickly than when they are transmitted through the electrically conductive reflective film 68 at regions where the penetration holes 70 are not formed. As a result, the reduction reaction occurs quickly in the electrochromic film 16, and the entire electrochromic film 16 is quickly colored.

Further, in the present exemplary embodiment, due to the inner diameter (diameter of the inner peripheral portion) dimension D of the penetration holes 70 being set at 5 μm (i.e., 20 μm or less), the penetration holes 70 basically cannot be directly visually observed. As a result, even when the penetration holes 70 are formed, no unnatural feeling is generated upon visually observing light reflected at the electrochromic mirror 60.

Figure 5:
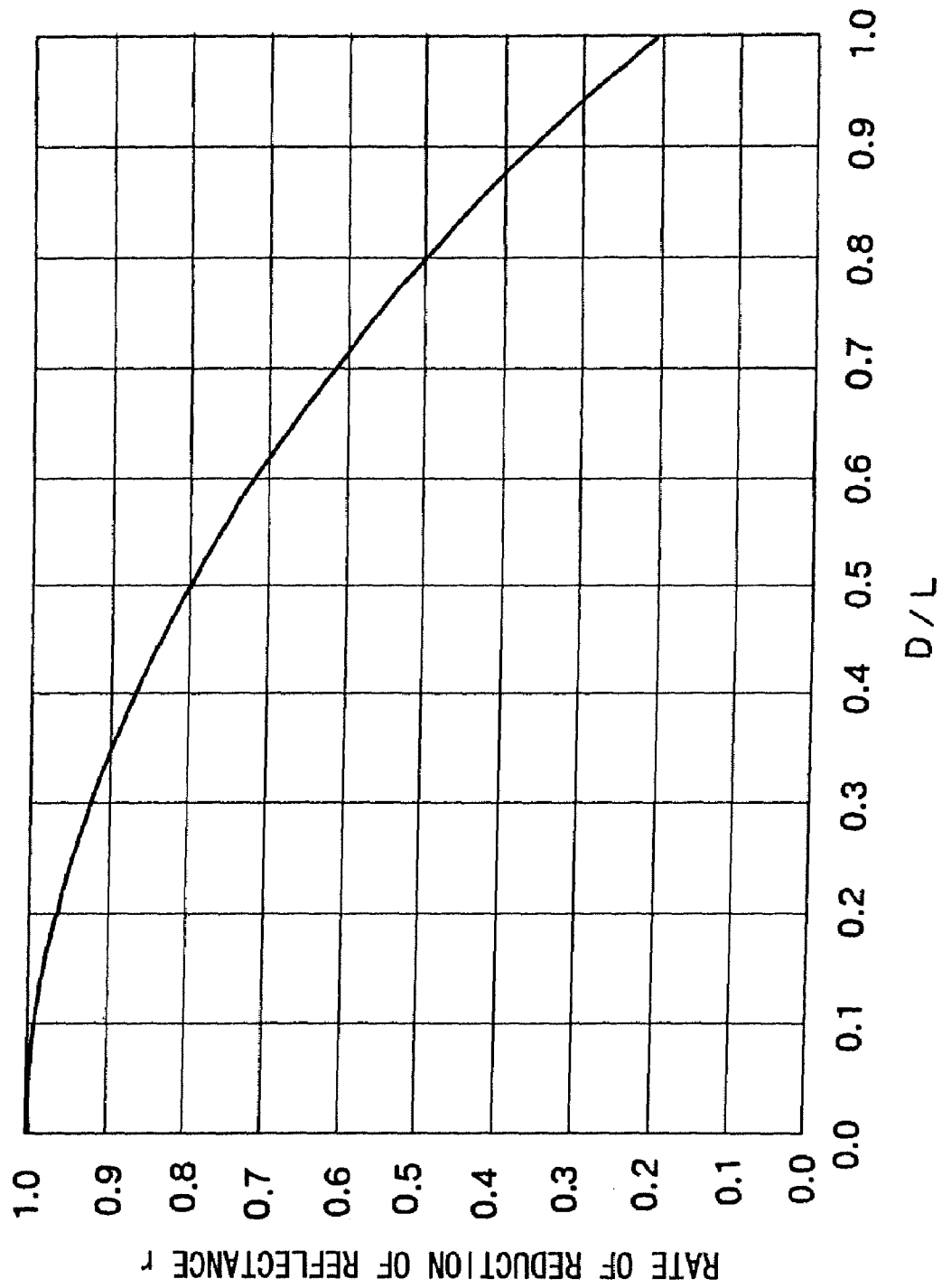
FIG. 5 is a graph showing the relationship between the ratio of an inner diameter dimension D of penetration holes and a distance L between centers of adjacent penetration holes, and the rate of reduction of reflectance at an electrochromic mirror due to formation of the penetration holes.

Meanwhile, in FIG. 5, the relationship between the ratio of the inner diameter (diameter of the inner peripheral portion) dimension D of the penetration holes 70 and the distance L between centers of adjacent penetration holes 70, and the rate of reduction of reflectance at the electrochromic mirror 60 due to the formation of the penetration holes 70 is shown. In the present exemplary embodiment, the ratio of the inner diameter dimension D of the penetration holes 70 and the distance L between centers of adjacent penetration holes 70 is 7 or more, and the ratio of the distance L between centers and the inner diameter dimension D, which is a reciprocal thereof, is 0.5 or less.

As a result, as shown in FIG. 5, 80% of the reflectance in the case where the penetration holes 70 are not formed can be ensured. In this manner, by setting the ratio of the inner diameter dimension D of the penetration holes 70 and the distance L between centers of adjacent penetration holes 70 to be 0.5, reduction in reflectance is kept low (about 20%), and light can be sufficiently reflected at the electrically conductive reflective film 68, in spite of the fact that the penetration holes 70 are formed.

Figure 6:
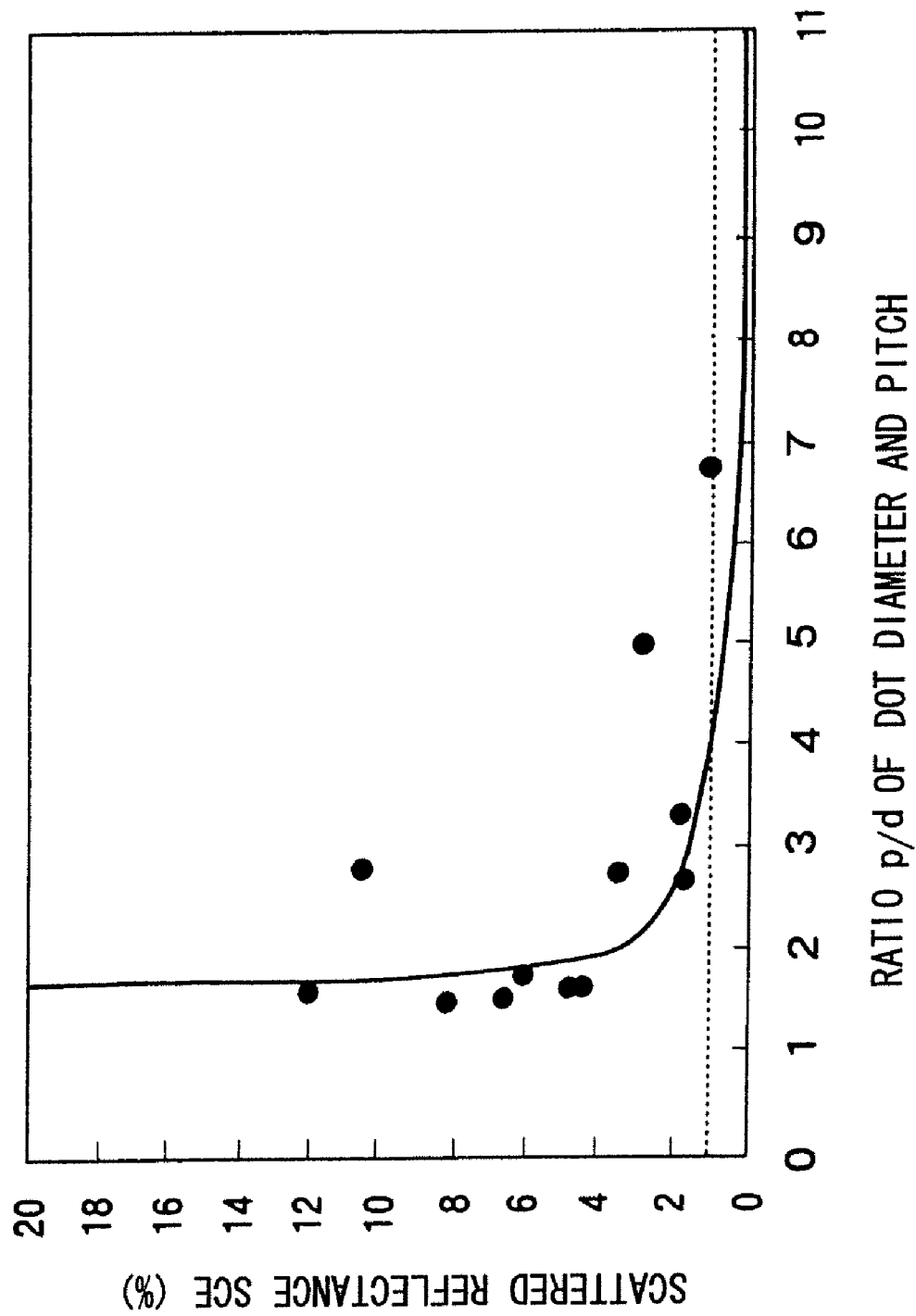
FIG. 6 is a graph showing the relationship between the ratio of the distance L between centers of adjacent penetration holes and the inner diameter dimension D of the penetration holes, and scattered reflectance.

Further, in FIG. 6, the relationship between the ratio of the inner diameter dimension D of the penetration holes 70 and the distance L between centers of adjacent penetration holes 70 and scattered reflectance is shown in a graph. As shown in this drawing, when the ratio of the inner diameter dimension D and the distance L between centers becomes 7 or more, scattering in light caused by a diffraction phenomenon of light of a boundary of the penetration holes 70 is extremely effectively reduced. As a result, a reflected image formed from reflected light can be prevented or effectively suppressed from generating optical interference or becoming clouded.

Moreover, in the present exemplary embodiment, although the inner diameter (diameter of an inner peripheral portion) dimension D of the penetration holes 70 formed in the electrically conductive reflective film 68 is set at 0.5 µm, in the case where not only the scattered reflectance described above but also the reaction time when the electrochromic film 16 is colored is considered, it is preferable to set the inner diameter dimension D of the penetration holes 70 at 300 nm or less, while also maintaining the ratio of the inner diameter dimension D of the penetration holes 70 and the aforementioned distance L between centers at 7 or more.

In other words, in the case where the opening shape of the penetration holes 70 is presumed to be a circular shape, when an amount of diffracted light of the light at an end portion of the penetration holes 70 is calculated from the diffraction theory of light and a ratio of the amount of diffracted light and the amount of incident light is further made to be a scattered reflectance SCE, it is found that SCE is proportional to the square of (D/L) as shown in the following formula 5.

$$SCE \propto (D/L)^2 \quad \text{(Formula 5)}$$

Meanwhile, due to lithium ions entering into the entire surface of the electrochromic film 16, the entire area thereof is colored. In the present exemplary embodiment, since the lithium ions enter into the electrochromic film 16 from the penetration holes 70, the time τ until the lithium ions reach portions that do not correspond to the penetration holes 70 in the electrochromic film 16 is generally proportional to the square of the distance and is therefore as shown in the following formula 6.

$$\tau \propto L^2 \quad \text{(Formula 6)}$$

From the above formula 5 and formula 6, the following formula 7 is obtained.

$$\tau \propto D/SCE \quad \text{(Formula 7)}$$

Figure 7:
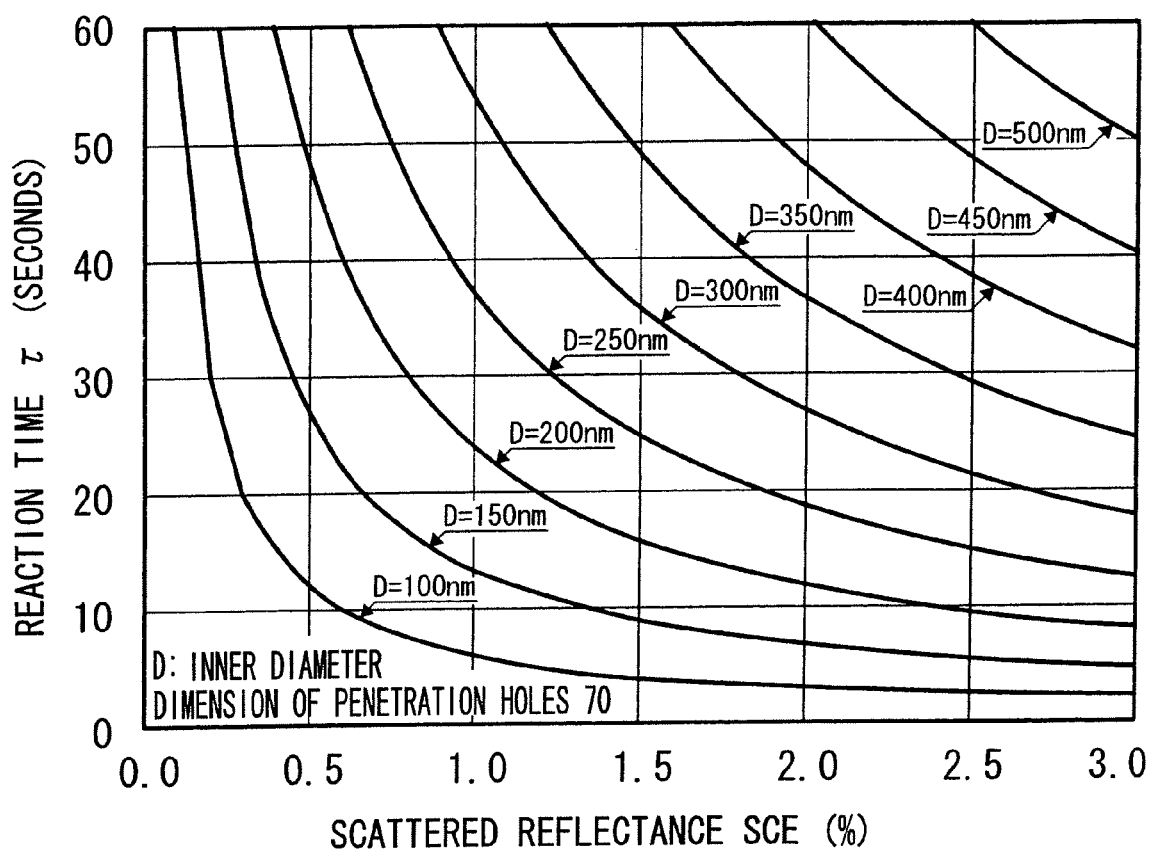
FIG. 7 is a graph showing the relationship between scattered reflectance and reaction time for each of inner diameter dimensions D of the penetration holes.

In consideration of the forgoing, the scattered reflectance SCE is measured for a case where the inner diameter D of the penetration holes 70 is set at 250 nm and the distance L between centers of the penetration holes 70 is set at 1.8 µm, upon which the proportional constant of formula 5 is found, and on this basis, the relationship between the scattered reflectance and the coloring reaction time of the electrochromic film 16 for cases in which the inner diameter D of the penetration holes 70 has been changed is shown in the graph in FIG. 7.

As shown in this drawing, from the standpoint of the scattered reflectance, it is more preferable the smaller the inner diameter dimension D of the penetration holes 70 is, but if the inner diameter D of the penetration holes 70 is set at 300 nm or less, a coloring reaction time of 30 seconds or less with scattered reflectance of 2% or less can be sufficiently maintained in practical use.

Configuration of Second Exemplary Embodiment

Next, other exemplary embodiments of the present invention will be explained. It should be noted that, in explaining the following respective exemplary embodiments, with regard to parts that are substantially the same as in exemplary embodiments, including the first exemplary embodiment, that have come before the exemplary embodiment being explained, the same reference numerals will be allotted thereto, and detailed description thereof will be omitted.

Figure 8:
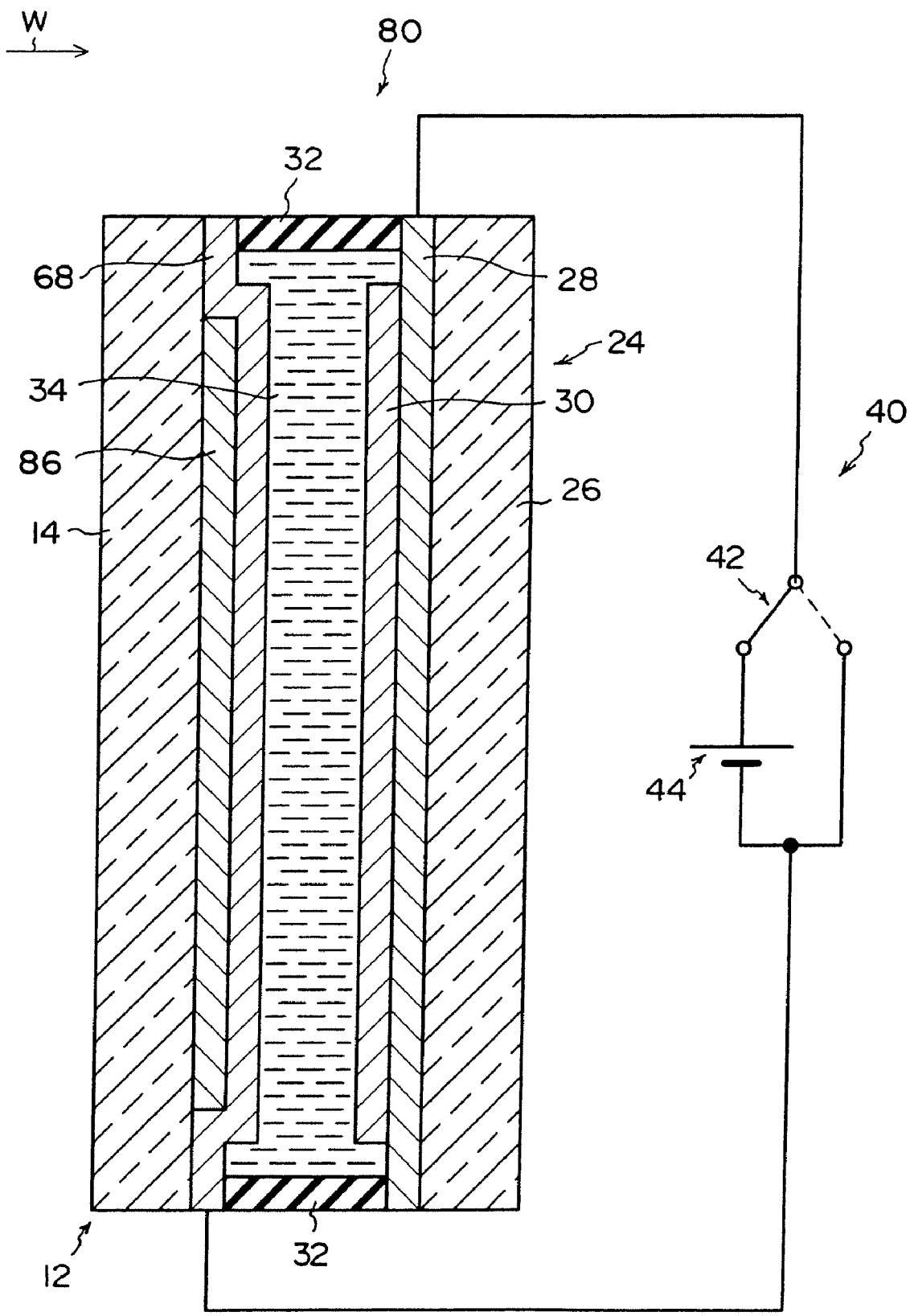
FIG. 8 is a cross-sectional view showing the outline of the configuration of an electrochromic mirror according to a second exemplary embodiment of the present invention.

In FIG. 8, the configuration of an electrochromic mirror 80 according to a second exemplary embodiment of the present invention is shown in schematic cross-sectional view.

Figure 9:
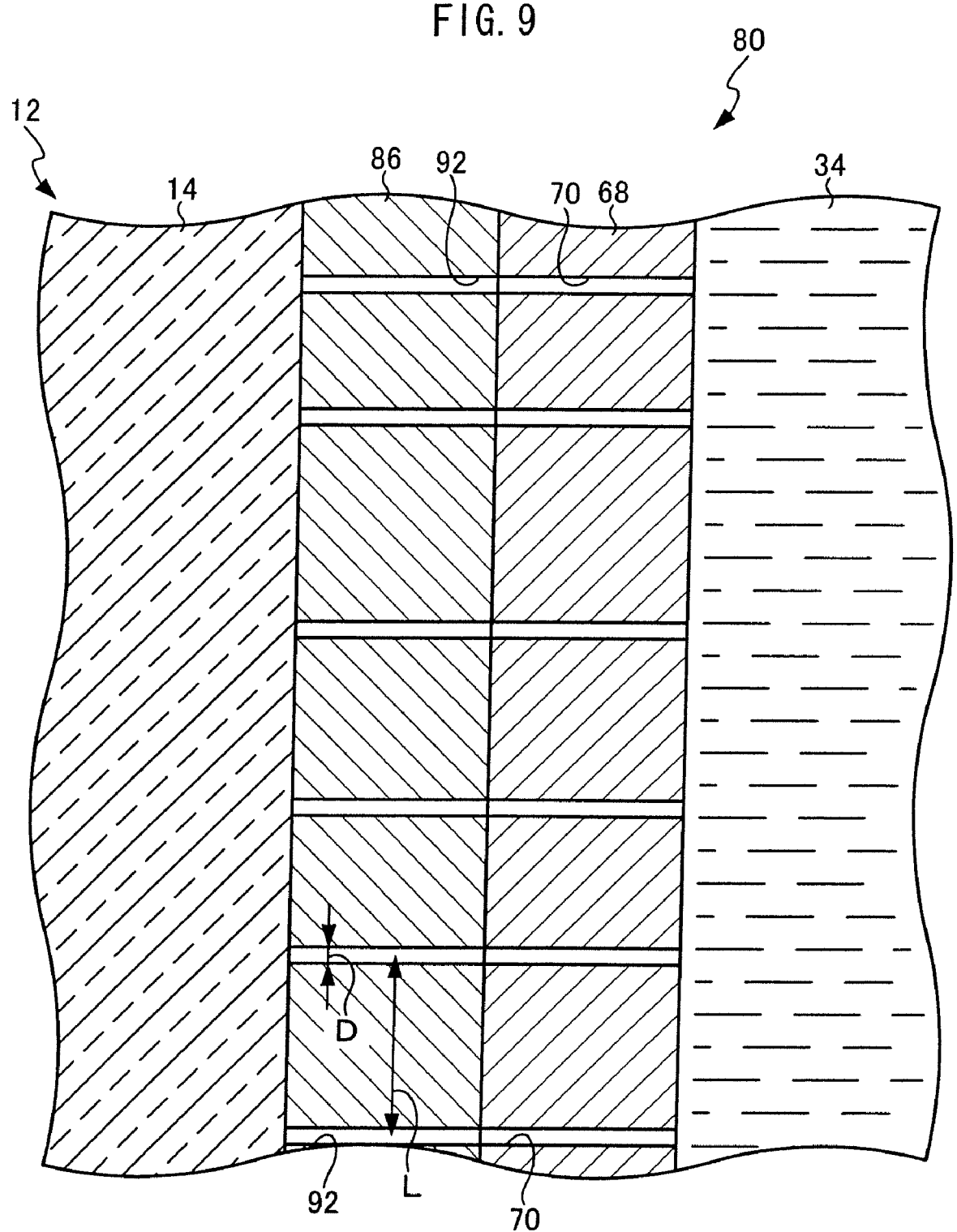
FIG. 9 is a schematic cross-sectional view in which the main portion of the electrochromic mirror according to the second exemplary embodiment of the present invention is enlarged.

As shown in this drawing, the electrochromic mirror 80 is not provided with the electrochromic film 16, and instead, is provided with an electrochromic film 86. The electrochromic film 86 is formed with the same material and with the same thickness as the electrochromic film 16, but as shown in FIG. 9, plural fine penetration holes 92 that penetrate in the thickness direction of the electrochromic film 86 are formed therein. The penetration holes 92 are in communication with the penetration holes 70, and the inner diameter (diameter of an inner peripheral portion) dimension D thereof is 20 µm or less and, in particular, is set at 0.5 µm in the present exemplary embodiment. Further, the penetration holes 92 are basically formed irregularly (randomly) in the electrochromic film 86. However, the distance L between centers of adjacent penetration holes 92 is set at 5 µm.

The penetration holes 92 are formed by providing a photomask, in which a pattern of the penetration holes 92 is printed on the electrochromic film 86 on which a photoresist has been coated, and carrying out exposure, followed by removing the photoresist corresponding to the penetration holes 92 and dissolving the electrochromic film 86 with an etching solution.

Operation and Effects of Second Exemplary Embodiment

In the electrochromic mirror 80 of the above configuration, the penetration holes 70 are formed in the electrically conductive reflective film 68, and the penetration holes 92 are formed in the electrochromic film 86. As a result, when the switch 42 is switched to the ON state and the voltage is applied, first, due to the fact that lithium ions (Li$^+$) constituting the electrolyte of the electrolytic solution 34 pass through the penetration holes 70, the lithium ions (Li$^+$) reach the electrochromic film 86 more quickly than when they are transmitted through the electrically conductive reflective film 68 at regions where the penetration holes 70 are not formed.

Furthermore, the lithium ions that have reached the electrochromic film 86 enter into the penetration holes 92 and enter into the electrochromic film 86 from the inner peripheral portions of the penetration holes 92. As a result, the reduction reaction occurs even more quickly in the electrochromic film 86, and the entire electrochromic film 86 is colored even more quickly.

Further, in the present exemplary embodiment, due to the inner diameter (diameter of the inner peripheral portion) dimension D of the penetration holes 92 being set at 5 µm (i.e., 20 µm or less) the penetration holes 92 basically cannot be directly visually observed. As a result, even when the penetration holes 92 are formed, no unnatural feeling is generated upon visually observing light reflected at the electrically conductive reflective film 68.

Furthermore, similarly to the case where the penetration holes 70 are formed in the electrically conductive reflective film 68, in the present exemplary embodiment, due to the inner diameter dimension D of the penetration holes 92 being set at 5 μm and the distance L between centers of adjacent penetration holes 92 being set at 10 μm, the ratio therebetween becomes 0.5. As a result, 80% of the reflectance in the case where the penetration holes 92 are not formed can be ensured. In this manner, by setting the ratio of the inner diameter dimension D of the penetration holes 92 and the distance L between centers of adjacent penetration holes 92 to be 0.5, reduction in reflectance is kept low (about 20%), and light can be sufficiently reflected at the electrochromic film 86 in spite of the fact that the penetration holes 92 are formed.

Further, in the present exemplary embodiment, although the distance L between centers of adjacent penetration holes 92 is set at 10 μm, the formation positions thereof are irregular (random), similarly to those of the penetration holes 70. For this reason, no regular interference in the light reflected at the electrochromic film 86 is generated. As a result, a reflected image can be made even more clear.

It should be noted that the configuration of the electrochromic mirror 80 according to the present exemplary embodiment is basically the same as that of the electrochromic mirror 60 according to the first exemplary embodiment, except for the fact that the electrochromic film 86 in which the penetration holes 92 are formed is provided in place of the electrochromic film 86. Accordingly, the electrochromic mirror 80 basically achieves the same operation as that of the electrochromic mirror 60 and can obtain the same effects as those of the electrochromic mirror 60.

Configuration of Third Exemplary Embodiment

Next, a third exemplary embodiment of the present invention will be explained.

Figure 10:
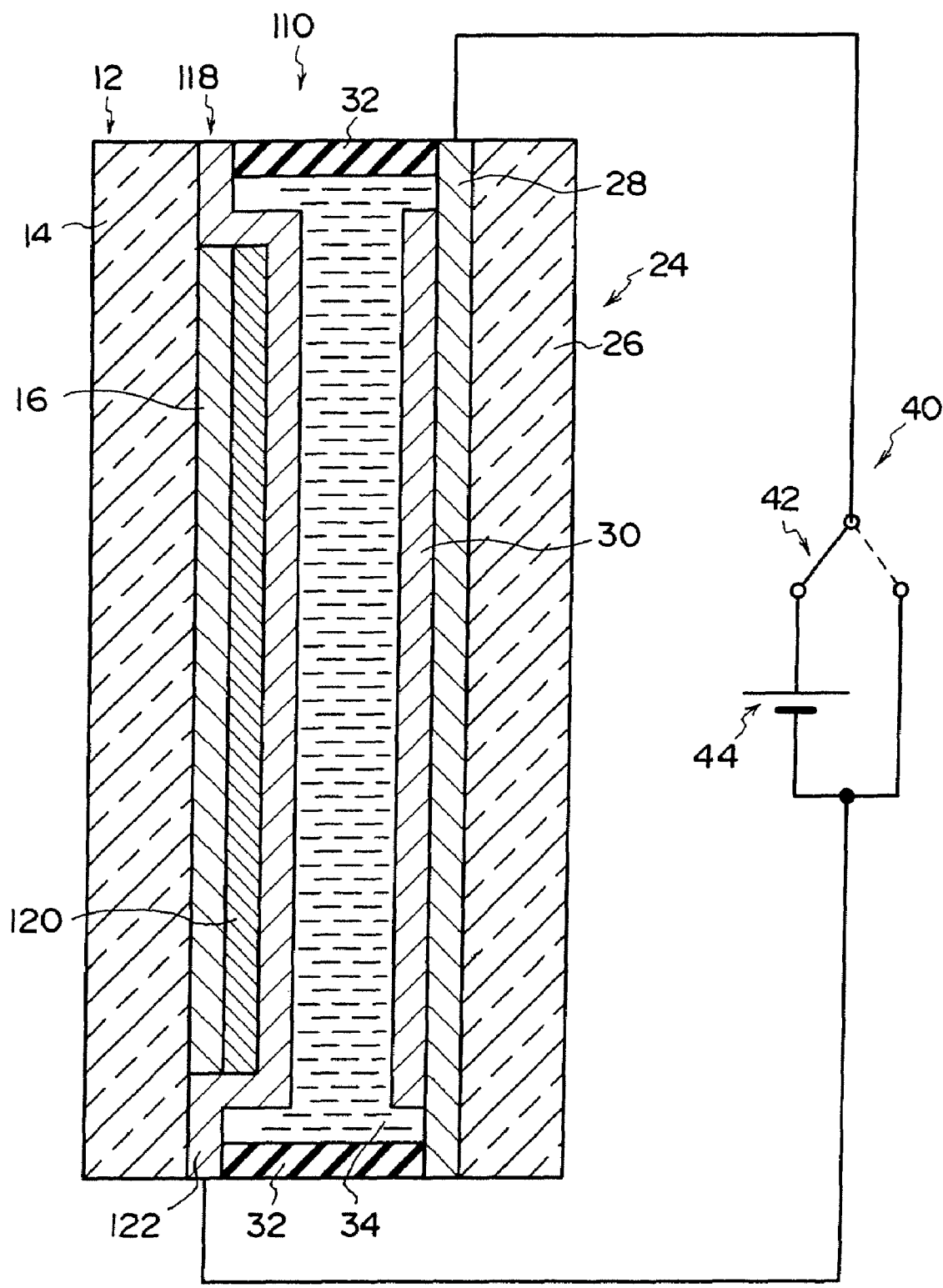
FIG. 10 is a cross-sectional view showing the outline of the configuration of an electrochromic mirror according to a third exemplary embodiment of the present invention.

In FIG. 10, the configuration of an electrochromic mirror 110 according to the present exemplary embodiment is shown in schematic cross-sectional view.

As shown in this drawing, the electrochromic mirror 110 is not provided with the electrically conductive reflective film 68, and instead, is provided with an electrically conductive reflective film 118. The electrically conductive reflective film 118 is constituted by a first electrically conductive reflective film 120 and a second electrically conductive reflective film 122 serving as an electrically conductive protection film. The first electrically conductive reflective film 120 is formed at a side of the electrochromic film 16 that is opposite from the substrate main body 14. The first electrically conductive reflective film 120 is formed from aluminum (Al), silver (Ag), indium (In) or the like. In contrast, the second electrically conductive reflective film 122 is formed from a metal that is more corrosion-resistant than the first electrically conductive reflective film 120, such as, for example, rhodium (Rh), ruthenium (Ru), palladium (Pd), nickel (Ni), chrome (Cr) or the like.

Further, an outer peripheral edge portion of the second electrically conductive reflective film 122 is formed so as to be positioned further toward an outer side than an outer peripheral edge portion of the first electrically conductive reflective film 120. As a result, the entire first electrically conductive reflective film 120 is covered by the second electrically conductive reflective film 122 from the side that is opposite from the electrochromic film 16.

Figure 11:
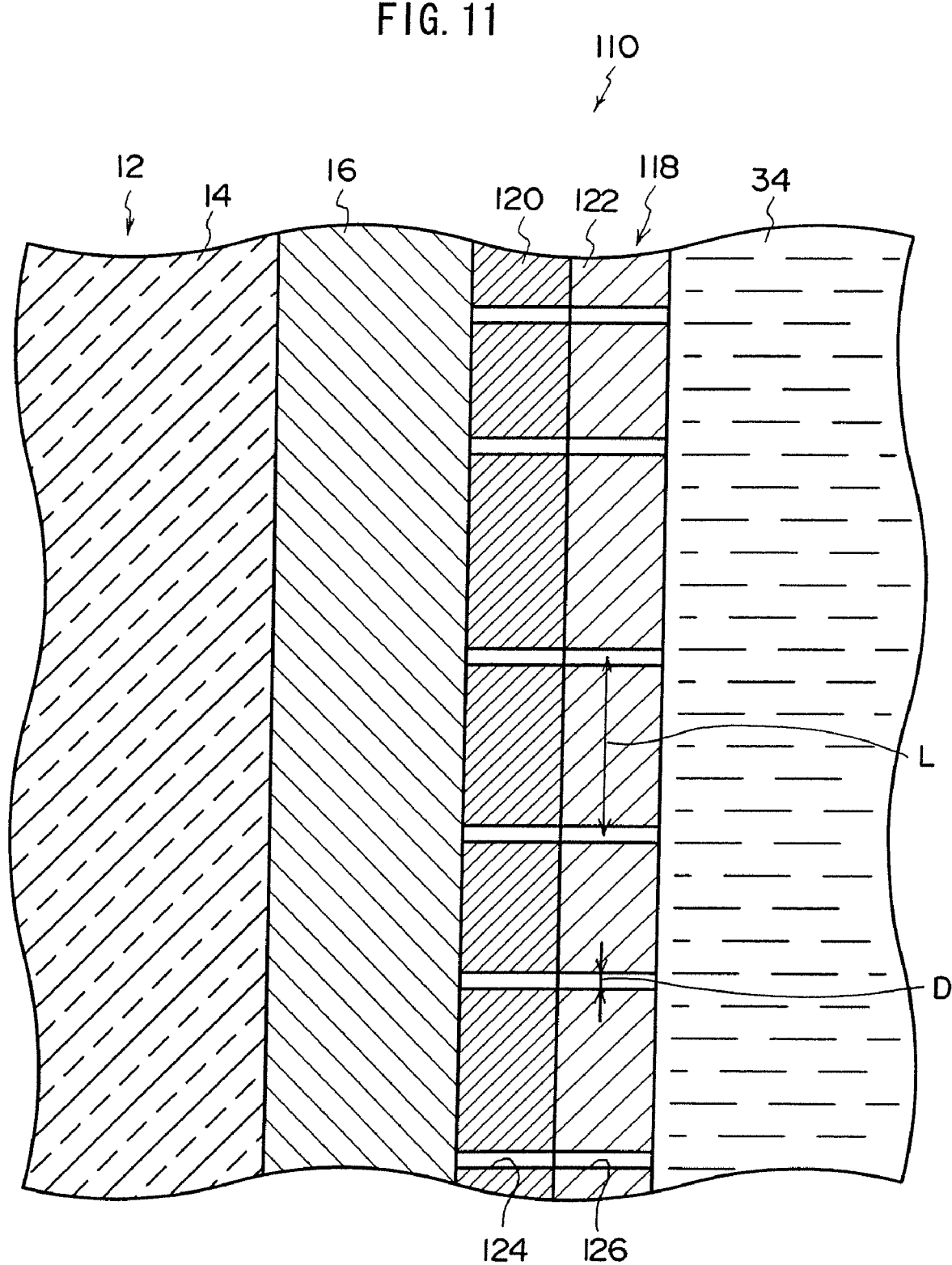
FIG. 11 is a schematic cross-sectional view in which the main portion of the electrochromic mirror according to the third exemplary embodiment of the present invention is enlarged.

Further, while the penetration holes 70 were formed in the electrically conductive reflective film 68 in the first and second exemplary embodiments, as shown in FIG. 11, in the present exemplary embodiment, penetration holes 124 corresponding to the penetration holes 70 are formed in the first electrically conductive reflective film 120, and penetration holes 126 corresponding to the penetration holes 70 are formed in the second electrically conductive reflective film 122, according to the same conditions as the penetration holes 70.

Operation and Effects of Third Exemplary Embodiment

In the electrochromic mirror 110 of the above configuration, light that is incident from the side of the substrate main body 14 that is opposite from the electrochromic film 86 is transmitted through the substrate main body 14 and the electrochromic film 16 and is reflected at the first electrically conductive reflective film 120. Further, any light that is transmitted through the first electrically conductive reflective film 120 without being reflected at the first electrically conductive reflective film 120 is reflected at the second electrically conductive reflective film 122.

Meanwhile, the electrolytic solution 34 is enclosed at the side of the electrically conductive reflective film 118 that is opposite from the electrochromic film 86. In the present electrochromic mirror 110, the electrolytic solution 34 side of the first electrically conductive reflective film 120, which mainly reflects the light, is covered by the second electrically conductive reflective film 122 formed from a metal that is more corrosion-resistant than the first electrically conductive reflective film 120. Therefore, the first electrically conductive reflective film 120 is protected by the second electrically conductive reflective film 122 with respect to the electrolytic solution 34, and it becomes harder for the first electrically conductive reflective film 120 to be corroded. As a result, light can be reflected in an excellent manner by the first electrically conductive reflective film 120 over a long period.

Moreover, the outer peripheral edge portion of the second electrically conductive reflective film 122 is positioned further toward the outer side than the outer peripheral edge portion of the first electrically conductive reflective film 120. As a result, the entire first electrically conductive reflective film 120 is covered by the second electrically conductive reflective film 122 from the side that is opposite from the electrochromic film 16, and not only the surface at the side that is opposite from the electrochromic film 16, but also the outer peripheral end of the first electrically conductive reflective film 120 is protected by the second electrically conductive reflective film 122 with respect to the electrolytic solution 34, so that corrosion of the first electrically conductive reflective film 120 can be effectively suppressed or prevented.

Furthermore, since the second electrically conductive reflective film 122 itself reflects light from the side of the substrate main body 14, although light that is transmitted through the substrate main body 14 further toward the outer side than the outer peripheral edge portion of the first electrically conductive reflective film 120 is not reflected at the first electrically conductive reflective film 120, it is instead reflected by the second electrically conductive reflective film 122. As a result, the reflection region of the light can be broadened (in other words, since a configuration is provided in which the entire first electrically conductive reflective film 120 is covered by the second electrically conductive reflective film 122, even if the first electrically conductive reflective film 120 is made to be smaller, the reflection region of the light is not narrowed).

It should be noted that the configuration of the electrochromic mirror 110 according to the present exemplary embodiment is basically the same as that of the electrochromic mirror 60 according to the first exemplary embodiment, except for the fact that the electrically conductive reflective film 118 comprising the first electrically conductive reflective film 120 in which the penetration holes 124 are formed and the second electrically conductive reflective film 122 in which the penetration holes 126 are formed is provided in place of the electrically conductive reflective film 68 in which the penetration holes 70 are formed. Accordingly, the electrochromic mirror 110 basically achieves the same operation as that of the electrochromic mirror 60 and can obtain the same effects as those of the electrochromic mirror 60.

Figure 12:
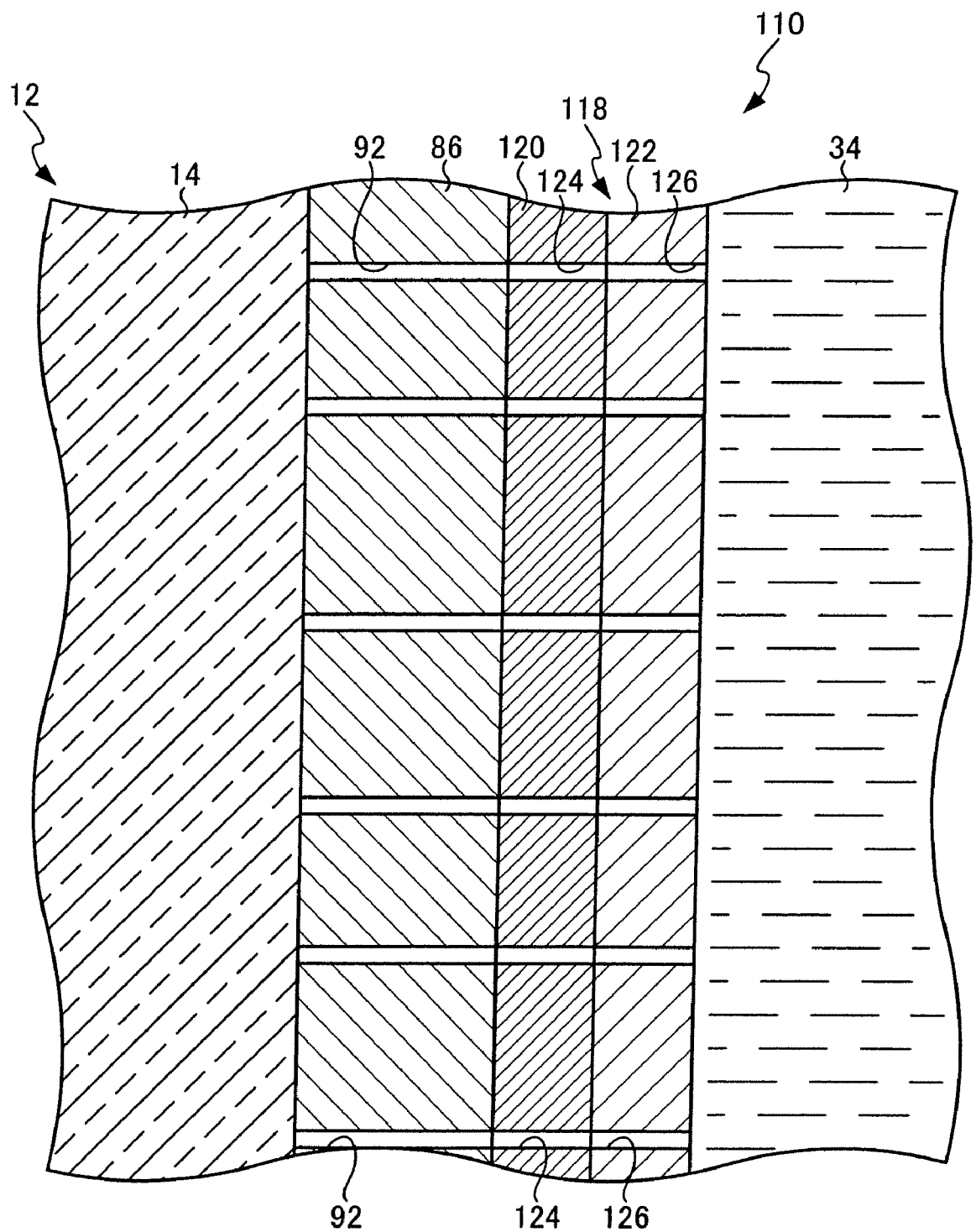
FIG. 12 is a schematic cross-sectional view corresponding to FIG. 11 and showing a modified example of the electrochromic mirror according to the third exemplary embodiment of the present invention.

Further, although the electrochromic mirror 110 according to the present exemplary embodiment has a configuration in which the electrochromic film 16 is provided, in the case of a configuration in which the electrochromic film 86 is provided in place of the electrochromic film 16 as shown in FIG. 12, the same operation as that of the electrochromic mirror 80 according to the second exemplary embodiment is achieved, and the same effects as those of the electrochromic mirror 80 can be obtained, in addition to the operation and effects of the present exemplary embodiment.

Configuration of Fourth Exemplary Embodiment

Next, a fourth exemplary embodiment of the present invention will be explained.

Figure 13:
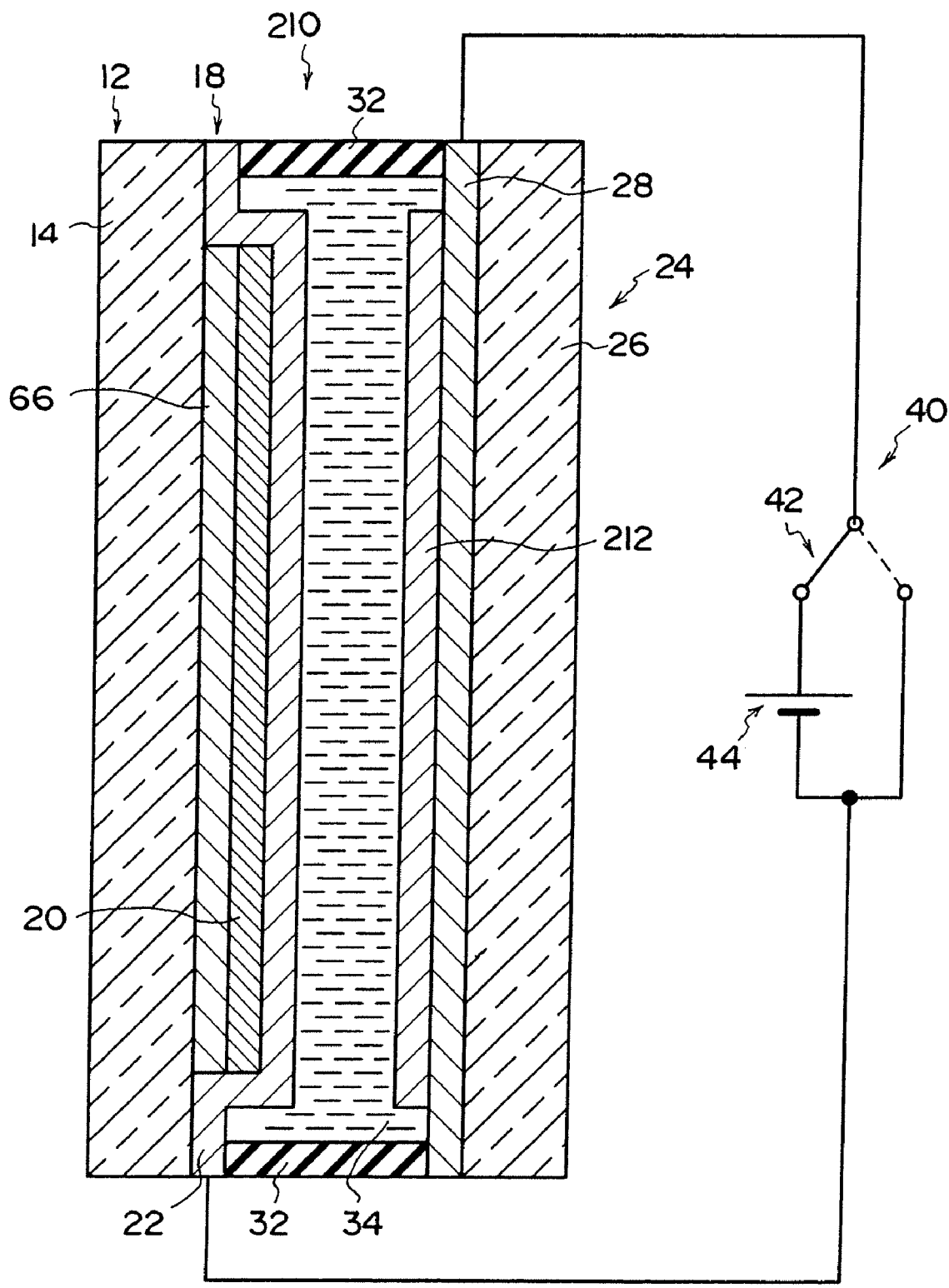
FIG. 13 is a cross-sectional view showing the outline of the configuration of an electrochromic mirror according to a fourth exemplary embodiment of the present invention.

In FIG. 13, the configuration of an electrochromic mirror 210 according to the present exemplary embodiment is shown in schematic cross-sectional view.

As shown in this drawing, the electrochromic mirror 210 is not provided with the carbon film 30, and instead is provided with a negative ion reaction film 212 as the reduction reaction compensation unit. The negative ion reaction film 212 is formed from an electrically conductive polymer such as polypyrrole, polyaniline, polyacetylene, polythiophene, polyparapyrene, polyfuran or the like, or a redox polymer such as polyvinylferrocene. For example, in a case where polypyrrole is used as the negative ion reaction film 212, formation is carried out by dissolving pyrrole in a solvent and coating this on the substrate main body 26. Further, in a case where polyvinylferrocene is used as the negative ion reaction film 212, formation is carried out by dissolving vinylferrocene in a solvent and coating this on the substrate main body 26. The mass of the negative ion reaction film 212 is set so as to be 0.012 mg/cm² or more.

Operation and Effects of Fourth Exemplary Embodiment

In the present electrochromic mirror 210, when the above-described reduction reaction of formula 1 occurs in the electrochromic film 16 due to the switch 42 being switched to the ON state, the electrically conductive polymer or redox polymer constituting the negative ion reaction film 212 is oxidized to take on a positive charge. As a result, negative ions ($ClO_4^-$) of the lithium perchlorate constituting the electrolyte enter into the negative ion reaction film 212 to establish a charge balance. In this manner, if the negative ion reaction film 212 is formed from polypyrrole, a compensation reaction such as that of the following formula 8a occurs, and if the negative ion reaction film 212 is formed from polyvinylferrocene, a compensation reaction such as that of the following formula 8b occurs, with respect to the aforementioned reduction reaction.

$$ClO_4^- + PPy - e^- \rightarrow PPy^+ \cdot ClO_4^- \quad \text{(Formula 8a)}$$

$$ClO_4^- + PVF - e^- \rightarrow PVF^+ \cdot ClO_4^- \quad \text{(Formula 8b)}$$

It should be noted that PPy indicates polypyrrole in formula 8a, and that PVF indicates polyvinylferrocene in formula 8b.

If the value of X in $Li_xWO_3$ is set at 0.15, the film thickness d of the electrochromic film 16 is set at 500 nm, the bulk density ρ of the tungsten trioxide constituting the electrochromic film 16 is set at 7.18 g/cm³, the degree of hole P of the tungsten trioxide constituting the electrochromic film 16 is set at 0.8, the molecular weight $M_W$ of the tungsten trioxide is set at 231.9 mol, and these are substituted in the following formula 9, a reaction amount (number of moles) n of the tungsten trioxide becomes 1.86 mM/cm².

$$n = (X \cdot d \cdot \rho \cdot P)/M_W \quad \text{(Formula 9)}$$

Furthermore, the same number of moles of the electrically conductive polymer or redox polymer constituting the negative ion reaction film 212 as that of the aforementioned n must also be reacted. Accordingly, when the molecular weight per monomer $M_P$ of the electrically conductive polymer or redox polymer used in the negative ion reaction film 212 is set at 65.07 g/mol and substituted in the following formula 10, a mass m of 0.012 mg/cm² of the electrically conductive polymer or redox polymer becomes necessary.

$$m = n \cdot M_P \quad \text{(Formula 10)}$$

In the present exemplary embodiment, m is set at 0.012 mg/cm² or greater for the negative ion reaction film 212. Therefore, a sufficient reduction reaction can be caused to occur in the electrochromic film 16, and as a result, by switching the switch 42 to the ON state and applying a voltage, the electrochromic film 16 can be sufficiently colored, as discussed above.

Furthermore, in the present exemplary embodiment, at the time of coloring the electrochromic film 16, the voltage that is applied can be lowered to 1.3 V. As a result, when the switch 42 is switched to the OFF state and the electrically conductive reflective film 68 and the electrically conductive film 28 are short-circuited, a reaction in the opposite direction from the above formula 8a or formula 8b occurs, and the electrochromic film 16 is quickly decolored.

When the electrochromic mirror 210 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear turns on its headlights, by switching the switch 42 to the ON state to color the electrochromic film 16 and reduce the reflectance, reflected light of the headlights can be reduced, and glare is lowered.

Configuration of Fifth Exemplary Embodiment

Figure 14:
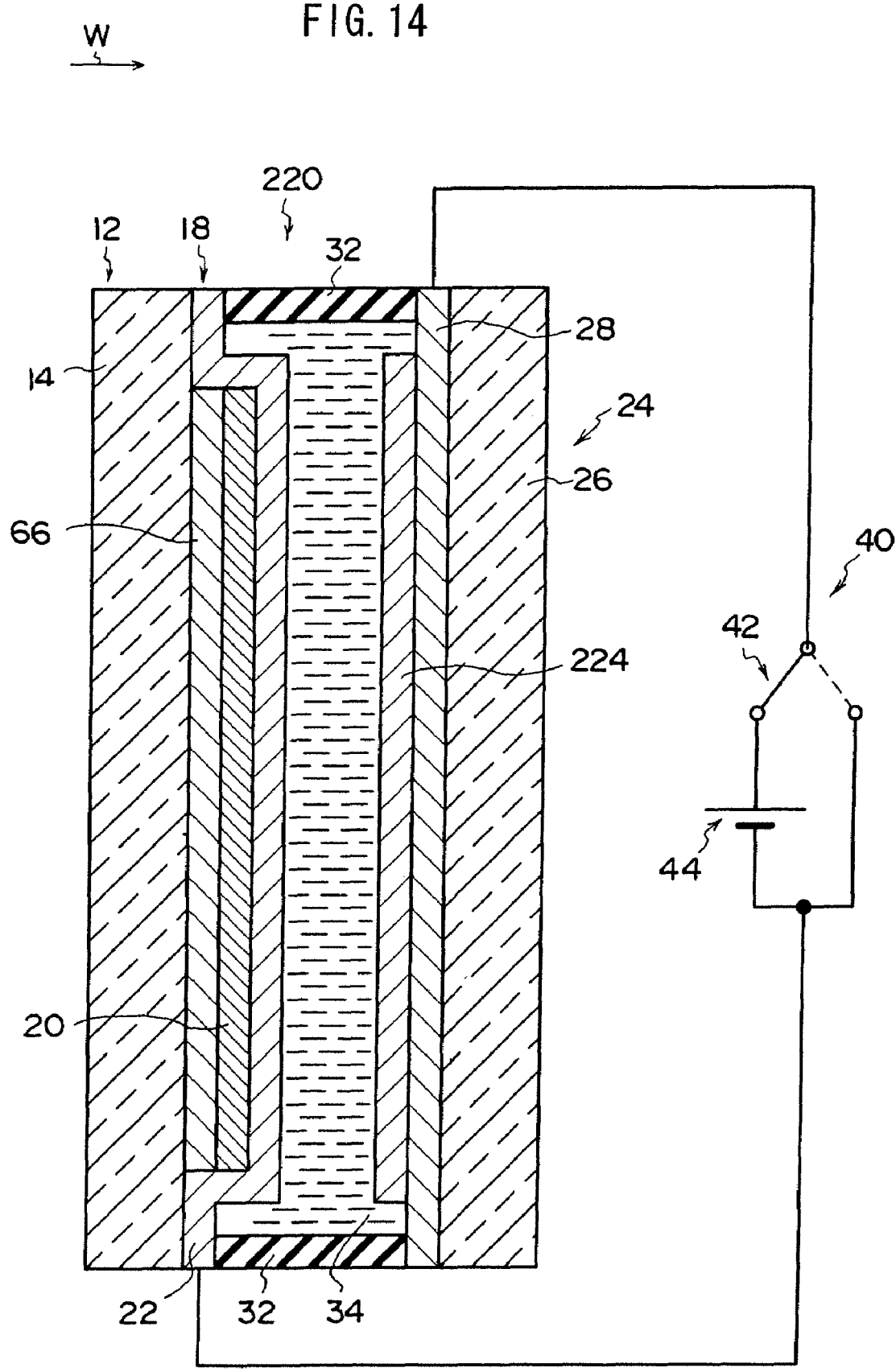
FIG. 14 is a cross-sectional view showing the outline of the configuration of an electrochromic mirror according to a fifth exemplary embodiment of the present invention.

In FIG. 14, the configuration of an electrochromic mirror 220 according to a fifth exemplary embodiment of the present invention is shown in schematic cross-sectional view.

As shown in this drawing, in the electrochromic mirror 220, the electrically conductive film 28 is formed from silver (Ag). The carbon film 30 is not formed at the surface at the front surface side substrate 12 side of the electrically conductive film 28, and instead, a hardly-soluble salt film 224 constituting the reduction reaction compensation unit is formed as a precipitation film. The hardly-soluble salt film 224 is formed from silver chloride, bromine chloride, thiocyanate chloride or the like, and in particular, in the present exemplary embodiment, the hardly-soluble salt film 224 is formed from silver chloride.

Operation and Effects of Fifth Exemplary Embodiment

In the present electrochromic mirror 220, when the reduction reaction of the above-described formula 1 occurs in the electrochromic film 16 due to the switch 42 being switched to the ON state, as shown in the following formula 1, negative ions (Cl⁻) of the lithium perchlorate constituting the electrolyte react with silver (Ag) constituting the electrically conductive film 28, and as a result, silver chloride (AgCl) is generated and precipitates on the hardly-soluble salt film 224 formed from silver chloride. As a result, compensation corresponding to the aforementioned reduction reaction is carried out.

$$Cl^- + Ag - e^- \rightarrow AgCl \quad \text{(Formula 11)}$$

In this manner, in the present exemplary embodiment, since the compensation reaction reliably occurs with respect to the reduction reaction in the electrochromic film 16, at the time of coloring the electrochromic film 16, the voltage that is applied can be lowered to 1.3 V. As a result, when the switch 42 is switched to the OFF state and the electrically conductive reflective film 68 and the electrically conductive film 28 are short-circuited, a reaction in the opposite direction from the above formula 1 and formula 11 occurs, and the electrochromic film 16 is quickly decolored.

When the electrochromic mirror 220 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear turns on its headlights, by switching the switch 42 to the ON state to color the electrochromic film 16 and reduce the reflectance, reflected light of the headlights can be reduced, and glare is lowered.

Configuration of Sixth Exemplary Embodiment

Figure 15:
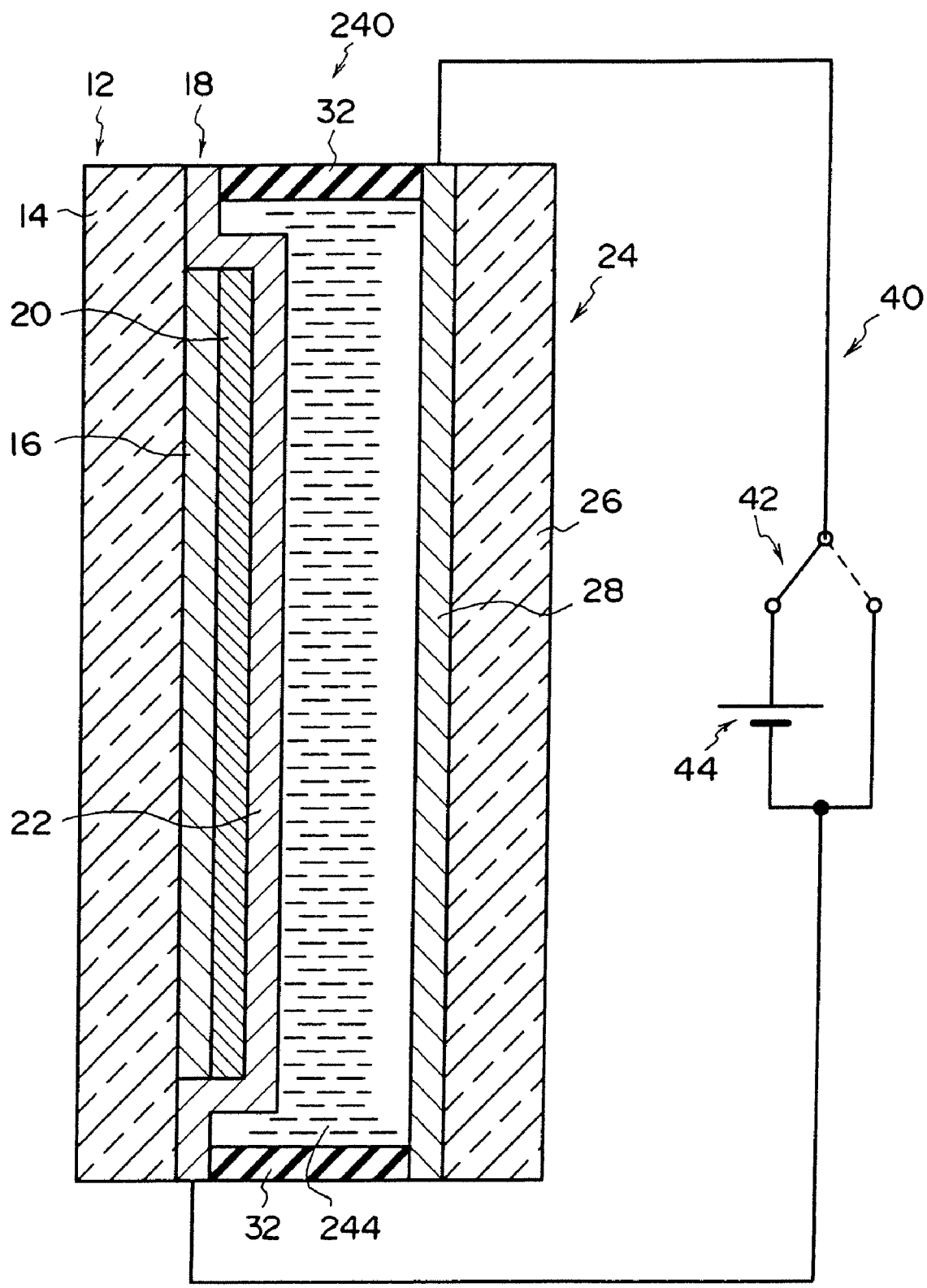
FIG. 15 is a cross-sectional view showing the outline of the configuration of an electrochromic mirror according to a sixth exemplary embodiment of the present invention.

In FIG. 15, the configuration of an electrochromic mirror 240 according to a sixth exemplary embodiment of the present invention is shown in schematic cross-sectional view.

As shown in this drawing, in the electrochromic mirror 240, the carbon film 30 is not formed at the surface at the front surface side substrate 12 side of the electrically conductive film 28. Further, an electrolytic solution 244 is enclosed between the front surface side substrate 12 and the back surface side substrate 24 in place of the electrolytic solution 34.

In addition to the materials constituting the electrolytic solution 34, the electrolytic solution 244 contains ferrocene (Fe(C₅H₅)₂), which is a neutral material serving as an oxidant constituting the reduction reaction compensation unit.

Operation and Effects of Sixth Exemplary Embodiment

In the present electrochromic mirror 240, when the above-described reduction reaction of formula 1 occurs in the electrochromic film 16 due to the switch 42 being switched to the ON state, the ferrocene contained in the electrolytic solution 244 takes on a positive charge as shown in the following formula 12. As a result, compensation corresponding to the aforementioned reduction reaction is carried out.

$$Fe(C_5H_5)_2 \rightarrow [Fe(C_5H_5)_2]^+ \quad \text{(Formula 12)}$$

In this manner, in the present exemplary embodiment, since the compensation reaction reliably occurs with respect to the reduction reaction in the electrochromic film 16, at the time of coloring the electrochromic film 16, the voltage that is applied can be lowered to 1.3 V. As a result, when the switch 42 is switched to the OFF state and the electrically conductive reflective film 68 and the electrically conductive film 28 are short-circuited, a reaction in the opposite direction from the above formula 1 and formula 12 occurs, and the electrochromic film 16 is quickly decolored.

When the electrochromic mirror 240 such as described above is used, for example, in a mirror main body of a rearview inner mirror, a rearview outer mirror (door mirror or fender mirror) or the like in a vehicle, during the daytime, the switch 42 can be maintained in the OFF state to conduct rear viewing with a high reflectance, and at nighttime or the like, when a vehicle to the rear turns on its headlights, by switching the switch 42 to the ON state to color the electrochromic film 16 and reduce the reflectance, reflected light of the headlights can be reduced, and glare is lowered.

It should be noted that, although the fourth exemplary embodiment through the sixth exemplary embodiment described above were modified examples of the first exemplary embodiment, the fourth exemplary embodiment through the sixth exemplary embodiment may be configured to be modified examples of the second exemplary embodiment or third exemplary embodiment.

Embodiments of the present invention are described above, but the present invention is not limited to the embodiments as will be clear to those skilled in the art.

According to a first aspect of the present invention, there is provided an electrochromic mirror comprising: an electrically conductive reflective film capable of reflecting light that is incident thereto and having electrical conductivity, the electrically conductive reflective film having formed therein a plurality of fine penetration holes that penetrate in a thickness direction of the electrically conductive reflective film, and a ratio of a distance between respective centers of the penetration holes and an inner peripheral diameter dimension of the penetration holes being 7 or more; an electrochromic film that is provided at a side of the electrically conductive reflective film at which the light is incident and reflected, and that is colored due to being subjected to a reduction reaction; an electrically conductive film having electrical conductivity that is provided at a side of the electrically conductive reflective film that is opposite from the electrochromic film; and an electrolytic solution that comprises lithium ions and is enclosed between the electrically conductive film and the electrically conductive reflective film, and in which, due to applying a voltage such that the electrically conductive film is made positive and the electrically conductive reflective film is made negative, the lithium ions are provided to the reduction reaction of the electrochromic film.

In the electrochromic mirror according to the aforementioned first aspect, light that has transmitted through the electrochromic film is reflected by the electrically conductive reflective film.

Further, when the voltage is applied such that the electrically conductive film is made positive and the electrically conductive reflective film is made negative, lithium ions of the electrolytic solution enclosed between the electrically conductive film and the electrically conductive reflective film move toward the side of the electrochromic film. Due to the lithium ions moving toward the side of the electrochromic film, the electrochromic film undergoes a reduction reaction, whereby the electrochromic film is colored. Due to the electrochromic film being colored in this manner, transmission of light in the electrochromic film is lowered.

In the electrochromic mirror of the aforementioned first aspect, plural fine penetration holes that penetrate in the thickness direction of the electrically conductive reflective film are formed in the electrically conductive reflective film. Therefore, when the voltage is applied such that the electrically conductive film is made positive and the electrically conductive reflective film is made negative, the lithium ions of the electrolytic solution pass through the penetration holes formed in the electrically conductive reflective film to easily and smoothly reach the electrochromic film. As a result, the reduction reaction smoothly and quickly occurs in the electrochromic film, and the electrochromic film is smoothly and quickly colored.

Moreover, since the ratio of the distance between centers of the plural penetration holes formed in the electrically conductive reflective film and the inner peripheral diameter dimension of the respective penetration holes is set to be 7 or more, interference or clouding of a reflected image caused by scattering of reflected light due to a diffraction phenomenon in a boundary or edge portion of the respective penetration holes within the electrically conductive reflective film is prevented or effectively suppressed. As a result, even though the plural penetration holes are formed in the electrically conductive reflective film as discussed above, a reflected image can be made to be clear.

In the aforementioned first aspect, a configuration may be provided in which a plurality of fine penetration holes that penetrate in a thickness direction of the electrochromic film are formed in the electrochromic film, and a ratio of a distance between respective centers of the penetration holes formed in the electrochromic film and an inner peripheral diameter dimension of the penetration holes formed in the electrochromic film is set at 7 or more.

According to the above configuration, plural fine penetration holes that penetrate in the thickness direction of the electrochromic film are formed in the electrochromic film. As a result, since the surface area of the electrochromic film is increased, when the voltage is applied such that the electrically conductive film is made positive and the electrically conductive reflective film is made negative, the reduction reaction smoothly and quickly occurs in the electrochromic film, and the electrochromic film is smoothly and quickly colored.

Moreover, since the ratio of the distance between centers of the plural penetration holes formed in the electrochromic film and the inner peripheral diameter dimension of the respective penetration holes is set to be 7 or more, interference or clouding of a reflected image caused by scattering of reflected light due to a diffraction phenomenon in a boundary or edge portion of the respective penetration holes within the electrochromic film is prevented or effectively suppressed. As a result, even though the plural penetration holes are formed in the electrochromic film as discussed above, a reflected image can be made to be clear.

In the aforementioned first aspect, a configuration may be provided in which the diameter dimension of the penetration holes formed in the electrically conductive reflective film is 20 $\mu$m or less, and a ratio of the diameter dimension and the distance between centers of the plurality of penetration holes formed in the electrically conductive reflective film is 0.5 or less.

According to the above configuration, since the diameter dimension of the penetration holes formed in the electrically conductive reflective film is set at 20 $\mu$m or less, visual observation of the penetration holes is extremely difficult, and the penetration holes are extremely inconspicuous. Moreover, since the ratio of the diameter dimension of the plural penetration holes formed in the electrically conductive reflective film and the distance between centers of the respective penetration holes is set at 0.5 or less, reduction of reflectance can be kept small.

In the aforementioned first aspect, a configuration may be provided in which the diameter dimension of the penetration holes formed in the electrically conductive reflective film is 300 nm or less.

According to the above configuration, since the diameter dimension of the plural penetration holes formed in the electrically conductive reflective film is set at 300 nm or less, scattered reflectance at an end portion of the penetration holes can be effectively suppressed, and moreover, the electrochromic film can be colored within a reaction time that is suitable for practical use.

In the aforementioned first aspect, a configuration may be provided in which the distance between respective centers of the plurality of penetration holes is 10 $\mu$m or less.

According to the above configuration, since the distance between respective centers of the plural penetration holes formed in the electrically conductive reflective film or the electrochromic film is set at 10 $\mu$m or less, the coloring speed of the electrochromic film between penetration holes becomes faster.

In the aforementioned first aspect, a configuration may be provided in which formation positions of the penetration holes are random.

According to the above configuration, since the formation positions of the plural penetration holes in the electrically conductive reflective film or the electrochromic film are random, no regular interference or the like of reflected light is generated. As a result, a reflected image can be made even more clear.

In the aforementioned first aspect, a configuration may be provided in which the electrically conductive reflective film comprises: a first electrically conductive reflective film having electrical conductivity that is formed at one thickness direction side of the electrochromic film and reflects light that has transmitted through the electrochromic film; and an electrically conductive protection film having electrical conductivity that is formed at a side of the first electrically conductive reflective film that is opposite from the electrochromic film, from a material that is more corrosion-resistant than a material constituting the first electrically conductive reflective film.

According to the above configuration, light that has transmitted through the electrochromic film is reflected by the first electrically conductive reflective film constituting the electrically conductive reflective film.

Meanwhile, when the reduction reaction is caused to occur in the electrochromic film to color the electrochromic film, the voltage is applied such that the first electrically conductive reflective film and the electrically conductive protection film are made negative.

The electrically conductive protection film, which is formed further toward the side of the electrolytic solution than the first electrically conductive reflective film, is formed from a material that is more corrosion-resistant than the material constituting the first electrically conductive reflective film. Therefore, the first electrically conductive reflective film is protected by the electrically conductive protection film, and it becomes harder for the first electrically conductive reflective film to be corroded. As a result, light can be reflected in an excellent manner by the first electrically conductive reflective film over a long period. Moreover, since it becomes harder for the first electrically conductive reflective film to be corroded due to being protected by the electrically conductive protection film, the first electrically conductive reflective film itself can be made thinner, and as a result, the overall thickness of the electrically conductive reflective film does not become thicker even when the electrically conductive protection film is provided.

In the aforementioned first aspect, a configuration may be provided in which the electrically conductive protection film comprises a second electrically conductive reflective film having electrical conductivity that reflects light from the side of the first electrically conductive reflective film.

The electrically conductive protection film that protects the first electrically conductive reflective film is configured as the second electrically conductive reflective film which reflects light from the side of the first electrically conductive reflective film. As a result, even if a portion of the light is transmitted through the first electrically conductive reflective film due to the first electrically conductive reflective film being made thinner, this transmitted light can be reflected at the second electrically conductive reflective film.

Further, in the case where the second electrically conductive reflective film is provided so as to cover the entire first electrically conductive reflective film from the side of the electrolytic solution and, moreover, so that the second electrically conductive reflective film is positioned further toward the outer side than the peripheral edge portion of the first electrically conductive reflective film, not only is the protection performance of the first electrically conductive reflective film by the second electrically conductive reflective film improved, but due to a portion of the second electrically conductive reflective film being positioned at the outer side of the peripheral edge portion of the first electrically conductive reflective film, light can be reflected even at the outer side of the first electrically conductive reflective film.

Further, in the aforementioned first aspect, a configuration may be provided in which the electrochromic mirror further comprises a reduction reaction compensation unit that compensates the reduction reaction by storing electrical charge in a state in which the voltage is applied or by carrying out an oxidation reaction with negative ions in the electrolytic solution.

When the voltage is applied such that the electrically conductive film is made positive and the electrically conductive reflective film is made negative, electrical charge is stored in the in the reduction reaction compensation unit or an oxidation reaction with negative ions in the electrolytic solution is carried out. As a result, the reduction reaction in the electrochromic film is compensated.

Further, in the above configuration, a configuration may be provided in which the reduction reaction compensation unit comprises a negative ion reaction film that is formed from an electrically conductive polymer or redox polymer and provided at an electrically conductive reflective film side of the electrically conductive film, and that is oxidized by negative ions that have moved toward the side of the electrically conductive film due to the voltage being applied.

When the voltage is applied such that the electrically conductive film is made positive and the electrically conductive reflective film is made negative, negative ions of the electrolytic solution move toward the side of the negative ion reaction film formed from the electrically conductive polymer or redox polymer, and the negative ion reaction film is oxidized by the negative ions.

In this manner, due to the negative ion reaction film being formed from the electrically conductive polymer or redox polymer, many negative ions are provided to the oxidation of the negative ion reaction film, and therefore, even if the aforementioned voltage that is applied to the electrically conductive film and the electrically conductive reflective film is low, the reduction reaction can be sufficiently caused to occur in the electrochromic film. Moreover, since the reduction reaction can be caused to occur in the electrochromic film even with a low voltage in this manner, the electrochromic film can be easily decolored after the termination of the voltage application.

Further, in the above configuration, a configuration may be provided in which the electrically conductive film is formed from silver or an alloy containing silver; the electrolytic solution comprises negative ions of a hardly-soluble salt that react with ions of silver forming the electrically conductive film when a voltage is applied such that the electrically conductive film is made positive and the electrically conductive reflective film is made negative; the electrochromic mirror further comprises a precipitation film that is formed from the hardly-soluble salt and provided at the electrically conductive reflective film side of the electrically conductive film, and that causes a precipitate, which is formed by a reaction between negative ions of the hardly-soluble salt that have moved toward the side of the electrically conductive film due to the voltage being applied and ions of silver constituting the electrically conductive film, to precipitate; and the reduction reaction compensation unit comprises the silver forming the electrically conductive film, the negative ions constituting the electrolytic solution, and the precipitation film.

When the voltage is applied such that the electrically conductive film is made positive and the electrically conductive reflective film is made negative, negative ions of the hardly-soluble salt constituting the electrolytic solution move toward the side of the electrically conductive film. These negative ions of the hardly-soluble salt react with ions of silver constituting the electrically conductive film and are precipitated on the precipitation film of the hardly-soluble salt provided at the electrically conductive reflective film side of the electrically conductive film.

In this manner, since an oxidation reaction corresponding to the reduction reaction in the electrochromic film can be sufficiently caused to occur at the electrically conductive film and the precipitation film, even if the aforementioned voltage that is applied to the electrically conductive film and the electrically conductive reflective film is low, the reduction reaction can be sufficiently caused to occur in the electrochromic film. Moreover, since the reduction reaction can be caused to occur in the electrochromic film even with a low voltage in this manner, the electrochromic film can be easily decolored after the termination of the voltage application.

Further, in the above configuration, a configuration may be provided in which the electrolytic solution contains a reaction material that can be oxidized by neutral molecules or negative ions and undergoes an oxidation reaction due to applying a voltage with the electrically conductive film being made positive and the electrically conductive reflective film being made negative, and the reduction reaction compensation unit comprises the reaction material.

The electrolytic solution is constituted containing, in addition to the lithium ions, a reaction material that can be oxidized by neutral molecules or negative ions, and when the voltage is applied such that the electrically conductive film is made positive and the electrically conductive reflective film is made negative, an oxidization reaction occurs in the reaction material constituting the electrolytic solution. As a result, the aforementioned reduction reaction in the electrochromic film is compensated, and even if the aforementioned voltage that is applied to the electrically conductive film and the electrically conductive reflective film is low, the reduction reaction can be sufficiently caused to occur in the electrochromic film.

Moreover, since the reduction reaction can be caused to occur in the electrochromic film even with a low voltage in this manner, the electrochromic film can be easily decolored after the termination of the voltage application.

As described above, in the electrochromic mirror according to the present invention, even when a configuration is provided in which holes are formed in the electrically conductive reflective film, the occurrence of problems, such as reflectance being greatly reduced or the like, can be prevented or effectively suppressed, and a clear reflected image can be obtained.

What is claimed is:

1. An electrochromic mirror comprising:
    an electrically conductive reflective film capable of reflecting light that is incident thereto and having electrical conductivity, the electrically conductive reflective film having formed therein a plurality of fine penetration holes that penetrate in a thickness direction of the electrically conductive reflective film, and a ratio of a distance between respective centers of the penetration holes and an inner peripheral diameter dimension of the penetration holes being 7 or more;
    an electrochromic film that is provided at a side of the electrically conductive reflective film at which the light is incident and reflected, and that is colored due to being subjected to a reduction reaction;
    an electrically conductive film having electrical conductivity that is provided at a side of the electrically conductive reflective film that is opposite from the electrochromic film; and
    an electrolytic solution that comprises lithium ions and is enclosed between the electrically conductive film and the electrically conductive reflective film, and in which, due to applying a voltage such that the electrically conductive film is made positive and the electrically conductive reflective film is made negative, the lithium ions are provided to the reduction reaction of the electrochromic film.

2. The electrochromic mirror according to claim 1, wherein a plurality of fine penetration holes that penetrate in a thickness direction of the electrochromic film are formed in the electrochromic film, and a ratio of a distance between respective centers of the penetration holes formed in the electrochromic film and an inner peripheral diameter dimension of the penetration holes formed in the electrochromic film is set at 7 or more.

3. The electrochromic mirror according to claim 1, wherein the diameter dimension of the penetration holes formed in the electrically conductive reflective film is 20 μm or less, and a ratio of the diameter dimension and the distance between centers of the plurality of penetration holes formed in the electrically conductive reflective film is 0.5 or less.

4. The electrochromic mirror according to claim 1, wherein the diameter dimension of the penetration holes formed in the electrically conductive reflective film is 300 nm or less.

5. The electrochromic mirror according to claim 1, wherein the distance between respective centers of the plurality of penetration holes is 10 μm or less.

6. The electrochromic mirror according to claim 1, wherein formation positions of the penetration holes are random.

7. The electrochromic mirror according to claim 1, wherein the electrically conductive reflective film comprises:
    a first electrically conductive reflective film having electrical conductivity that is formed at one thickness direction side of the electrochromic film and reflects light that has transmitted through the electrochromic film; and
    an electrically conductive protection film having electrical conductivity that is formed at a side of the first electrically conductive reflective film that is opposite from the electrochromic film, from a material that is more corrosion-resistant than a material constituting the first electrically conductive reflective film.

8. The electrochromic mirror according to claim 7, wherein the electrically conductive protection film comprises a second electrically conductive reflective film having electrical conductivity that reflects light from the side of the first electrically conductive reflective film.

9. The electrochromic mirror according to claim 1, further comprising a reduction reaction compensation unit that compensates the reduction reaction by storing electrical charge in a state in which the voltage is applied or by carrying out an oxidation reaction with negative ions in the electrolytic solution.

10. The electrochromic mirror according to claim 9, wherein the reduction reaction compensation unit comprises a negative ion reaction film that is formed from an electrically conductive polymer or redox polymer and provided at an electrically conductive reflective film side of the electrically conductive film, and that is oxidized by negative ions that have moved toward the side of the electrically conductive film due to the voltage being applied.

11. The electrochromic mirror according to claim 9, wherein:
    the electrically conductive film is formed from silver or an alloy containing silver;
    the electrolytic solution comprises negative ions of a hardly-soluble salt that react with ions of silver forming the electrically conductive film when a voltage is applied such that the electrically conductive film is made positive and the electrically conductive reflective film is made negative;
    the electrochromic mirror further comprises a precipitation film that is formed from the hardly-soluble salt and provided at the electrically conductive reflective film side of the electrically conductive film, and that causes a precipitate, which is formed by a reaction between negative ions of the hardly-soluble salt that have moved toward the side of the electrically conductive film due to the voltage being applied and ions of silver constituting the electrically conductive film, to precipitate; and
    the reduction reaction compensation unit comprises the silver forming the electrically conductive film, the negative ions constituting the electrolytic solution, and the precipitation film.

12. The electrochromic mirror according to claim 9, wherein:
    the electrolytic solution contains a reaction material that can be oxidized by neutral molecules or negative ions and undergoes an oxidation reaction due to applying a voltage with the electrically conductive film being made positive and the electrically conductive reflective film being made negative; and
    the reduction reaction compensation unit comprises the reaction material.

* * * * *